(12) United States Patent
Haydu

(10) Patent No.: US 7,831,338 B1
(45) Date of Patent: Nov. 9, 2010

(54) ELECTRONICALLY ZONED REMOTE ACTUATED DEVICE

(76) Inventor: Steven Haydu, 1286 Amanda Cir., Decatur, GA (US) 30033

( * ) Notice: Subject to any disclaimer, the term of this patent is extended or adjusted under 35 U.S.C. 154(b) by 961 days.

(21) Appl. No.: 11/656,684

(22) Filed: Jan. 23, 2007

(51) Int. Cl.
*G05D 7/00* (2006.01)

(52) U.S. Cl. .................. 700/276; 700/277; 700/282

(58) Field of Classification Search .............. 700/275, 700/276, 277, 278, 282
See application file for complete search history.

(56) References Cited

U.S. PATENT DOCUMENTS

| | | | |
|---|---|---|---|
| 4,969,508 A | 11/1990 | Tate et al. .................. 165/209 |
| 5,390,206 A | 2/1995 | Rein et al. .................. 375/130 |
| 5,449,319 A | 9/1995 | Dushane et al. ............. 454/319 |
| 5,467,919 A | 11/1995 | Tamblyn .................... 236/49.3 |
| RE37,245 E | 6/2001 | Scholten et al. ............ 236/49.3 |
| 6,453,687 B2 * | 9/2002 | Sharood et al. ............... 62/127 |
| 6,851,621 B1 * | 2/2005 | Wacker et al. .............. 700/276 |
| 6,934,862 B2 * | 8/2005 | Sharood et al. ............. 713/300 |
| 7,055,759 B2 * | 6/2006 | Wacker et al. .............. 700/276 |
| 7,222,800 B2 * | 5/2007 | Wruck ....................... 236/51 |
| 7,277,080 B2 * | 10/2007 | Goulthorpe ................. 345/108 |
| 7,294,026 B1 * | 11/2007 | Donnell et al. .............. 439/701 |
| 7,664,573 B2 * | 2/2010 | Ahmed ...................... 700/276 |
| 7,672,590 B2 * | 3/2010 | Niedrich et al. ............... 398/66 |
| 2005/0040247 A1 * | 2/2005 | Pouchak ................... 236/44 C |
| 2006/0290525 A1 * | 12/2006 | Andersen et al. ............ 340/632 |

* cited by examiner

*Primary Examiner*—Charles R Kasenge
(74) *Attorney, Agent, or Firm*—Law Offices of J. D. Geraigery; Janine D. Geraigery

(57) ABSTRACT

A localized controlled air regulation system that includes a control unit, an actuator interface module and a valve assembly, wherein the control unit makes a localized connection to an air distribution device that is connected to the actuator interface module to regulate the flow of air through the valve assembly via commands received from the control unit.

36 Claims, 17 Drawing Sheets

ELECTRONICALLY ZONED REMOTE ACTUATED DEVICE

BACKGROUND OF THE INVENTION

1. Field of the Invention

This invention relates to the regulation of air flow, and more particularly, to a localized controlled air regulation system for remotely controlling a damper by a control unit that makes a wired connection to an air distribution device, to electrically connect to an actuator dedicated to control the damper.

Conventional means of regulating air flow with dampers in branch ducts concealed by inaccessible building surfaces consist of three methods. Power delivery to actuate the dampers will differ with each method. Manual power is transferred mechanically with the widely accepted first method. The second method uses building control circuits in addition to permanent electrical or pneumatic power. The third method uses low voltage direct current power supplied by batteries at a user terminal.

The most commonly used first method incorporates mechanical cabling for remote damper actuation. A flexible steel braided cable is connected between the damper and a user terminal. The cable connection at the damper is made with a universal type coupling and a worm gear assembly attached to the damper shaft. The user terminal is typically located on finished surfaces of inaccessible ceilings or shaft walls within occupied space and consists of a removable cover plate and recessed drive receptor. Connected to the cable, the drive receptor provides the means for manually twisting or pushing the cable to affect the desired adjustment of the remote damper. Functional failures of this method occur at the worm gear assembly and along the length of the cable with the risk of failure increasing proportionally with increased cable length. A functional failure renders the damper non adjustable and therefore fixed in position. Aesthetic failures of this method occur at the locations of the user terminals. Coordination, placement, and finishing of the assembly that comprises the user terminal, in finished surfaces of occupied spaces are difficult and labor intensive. Creating a visual impact on finished surfaces, user terminals are rarely accessed after the initial balancing process during system startup.

The second conventional method uses a pneumatically or electrically actuated damper that is permanently connected to the building power and control circuits. This method employs the same process used to procure, install and communicated with a system control damper. Control dampers are repositioned periodically during system operation thereby requiring permanent power for on demand actuation. Balancing dampers are adjusted once and set in a fixed position thereby requiring either physical access for manual adjustment or remote actuation. Achieving remote actuation of a balancing damper via a control damper protocol is cost prohibitive and renders this method nonviable except in criteria specific cases.

The third method uses a commercially available damper with a low voltage, remotely powered, hand held (18) volt power pack and electric actuator attached to the damper shaft. Low voltage wiring encased in flexible metal conduit is connected between the actuator and a user terminal. This terminal is typically located in finished walls and is configured functionally and visually equal to a conventional, four conductor registered jack eleven phone jack. The terminal provides the port for a user supplied direct current voltage source to power the actuator, thereby driving the damper open or closed based on the relative polarity, positive or negative, of the voltage source.

2. Description of the Related Art

U.S. Reissue Pat. No. RE37,245 to Scholten et al., discloses a control for a variable air volume terminal of a variable air volume air conditioning system which comprises a temperature sensing circuitry for generating a temperature process value, a setpoint determining circuitry for establishing a temperature setpoint, an airflow signal circuitry for generating an airflow setpoint in response to the temperature process value and the temperature setpoint, a flow sensing circuitry for generating a flow process value in response to a predetermined set of flow sensing inputs and damper control circuitry for generating a damper motor operation signal to control the damper motor in response to the flow process value and the airflow setpoint. The damper control circuitry comprises a fuzzy logic control mechanism for implementing a set of fuzzy logic rule-based instructions in generating the damper motor operating signal.

U.S. Pat. No. 5,467,919 to Tamblyn discloses an air conditioning system which provides for controlling the flow of conditioned air from a duct to a predetermined location of an occupied area of a building. A fitting is secured at one end thereof to the duct and has a moveable butterfly valve mounted therein for selectively controlling flow of conditioned air therethrough, the fitting including a motor and motor control relay for controlling operation of the valve. An outlet is mounted in association with wall means adjacent the location and spaced from the fitting. A flexible conduit is connected to another end of the fitting means and extends from the fitting means to and is connected with the outlet means. A remote signal receiver is in electrical circuit with the motor means and motor control relay and is located to receive a transmitted signal and there is a remote controlled signal transmitter signal compatible with the receiver whereby an occupant in the location may remotely control through actuation of the transmitter, the position of the valve in the fitting means and thus control the flow of conditioned air through the outlet means to the location.

U.S. Pat. No. 4,969,508 to Tate et al., discloses an environment control system permitting the occupant of a room or space in a multi-room building sharing a common air supply conduit with other rooms to control the environment in his or her room selectively and/or automatically. The system=includes a small wireless portable remote control unit readily accessible to the occupant for selecting predetermined conditions. These conditions are transmitted to a remote receiver which provides signals to a main control unit coupled to external environmental control units such as motors which operate damper valves in the room, air conditioning units supplying air to the common conduit heaters within the room and the like. Both the remote control unit and the main control unit include a programmed microcontrol. The portable control unit may be used to select the desired environmental conditions within the room while the lights are on and transmits this information to the main control unit which acts to energize and deenergize the external control units. When the occupant leaves the room and turns the light off, infrared transmissions from the portable control unit cease after a short period of time and the main control unit thereafter takes over and controls the temperature in the room in accordance with programmed conditions.

U.S. Pat. No. 5,390,206 to Rein et al., discloses a hierarchical control system including a central receiver; a first communications medium operably connecting the central receiver to at least one control; and a control operably connected to the central receiver by the first communications medium. The system also includes a sensor for sensing conditions; a second communication medium; and a transmitter for transmitting the sensed conditions from the sensor to the central receiver via the second communications medium. The central receiver also includes receiver for receiving transmissions on the second communications medium and a transmitter for retransmitting the transmissions on the first communications medium.

U.S. Pat. No. 5,449,319 to Dushane et al., discloses a retrofittable heating and air conditioning system for a single family dwelling including a heater and air conditioning furnace system connected to individual zones of a building by a series of output ducts. Each opening of a duct to an individual zone may have a unique, fully sealing, controllable output register assembly. Also, in each zone is a thermostat for sensing the zone temperature and for providing a means for the user to control the temperature of that zone. The system further includes a master control with such temperature controlling features as a universal zone control, individual zone controls, and a timer. Finally, the system includes a central control for controlling the register assemblies and the air conditioning, heating, and fan with respect to instructions set by the individual zone registers and the master control.

While these units may be suitable for the particular purpose employed, or for general use, they would not be as suitable for the purposes of the present invention as disclosed hereafter.

SUMMARY OF THE INVENTION

It is an object of the invention to produce a means for regulating the flow of air in a building duct. Accordingly, the present invention is a localized controlled air regulation system having a control unit, an actuator interface module and a valve assembly for regulating air flow.

It is another object of the invention to provide a localized control of the valve assembly. Accordingly, the air regulation system of the present invention includes the control unit which makes a localized connection with the actuator interface module via an industrial ethernet connector located in an air distribution device to allow an operator to remotely control the valve assembly concealed in a building duct.

It is another object of this invention to provide a localized control of any of the connected valve assemblies. Accordingly, the air regulation system of the present invention includes the control unit which makes a localized connection with the actuator interface module via the industrial ethernet connector located at any terminal unit or convenient building surface, to allow an operator to remotely control the valve assembly concealed in a building duct.

It is another object of the invention to provide a means for controlling valves including gases, fluidized solids, slurries and liquids. Accordingly the air regulation system of the present invention includes the control unit which makes a localized connection with the actuator interface module via an industrial ethernet connector located at any convenient building surface, to allow an operator to remotely control a fluid valve assembly concealed in any building or product space that is inaccessible.

It is another object of the invention to provide a means of remotely sensing the modulated air stream in the multiple valve assemblies, and observing the regulated air flow in real time. Accordingly, the air regulation system of the present invention includes a coiled network connector cable that provides connection between the control unit and the industrial ethernet connector located in the air distribution device for making a localized connection.

It is another object of the invention to allow an operator to send commands for the regulation of air flow in a building duct. Accordingly, the air regulation system of the present invention includes the actuator interface module that provides connection between the control unit and the valve assembly allowing commands to be sent to from the control unit to regulate the flow of air in the valve assembly.

It is another object of the invention to provide a means for controlling multiple valve assemblies to regulate air flow from a single source. Accordingly, the air regulation system of the present invention includes a hub unit that is connected between the actuator interface module and the industrial ethernet connector located in the air distribution device for controlling up to eight valve assemblies from the control unit.

It is another object of the invention to provide a means for ensuring proper functioning of each component prior to regulating the flow of air in a building duct. Accordingly, the air regulation system of the present invention includes a tester unit that makes a localized connection to the actuator interface module and the CAT5E plenum cable to determine proper operation after installation.

This invention is a localized controlled air regulation system that includes a control unit, an actuator interface module, a valve assembly and an airflow sensor, wherein the control unit makes a localized connection to an air distribution device that is connected to the actuator interface module to regulate the flow of air through the valve assembly via commands received from the control unit.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
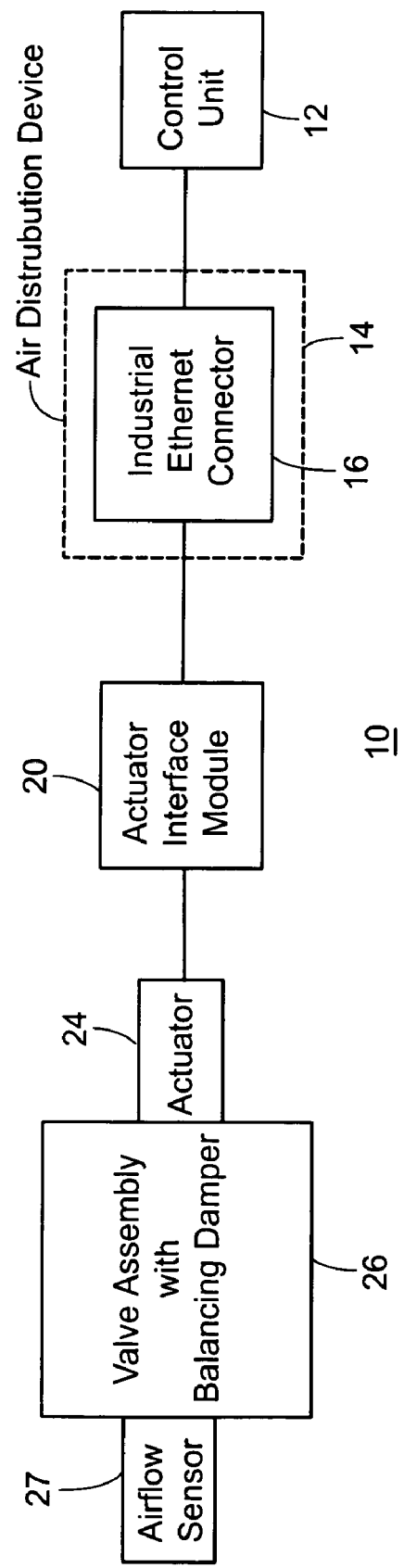
FIG. 1 is an illustrative block diagram of the present invention having a control unit, an actuator interface module and a valve assembly for regulating air flow.

FIG. 1 illustrates a block diagram of a localized controlled air regulation system 10 for adjusting a damper system concealed in building utility spaces inaccessible to construction or maintenance personnel. The air regulation system 10 includes a control unit 12 connected to an air distribution device 14 at an industrial ethernet connector 16 located in the air distribution device 14. Alternatively, the industrial ethernet connector 16 is located at a terminal box. Alternatively, the industrial ethernet connector 16 is located on mechanical equipment, air moving equipment or any accessible building surface. A coiled network connector cable 18 provides the connection between the control unit 12 and the industrial ethernet connector 16. An actuator interface module 20 provides module interface with the control unit 12. The actuator interface module 20 is connected to the industrial ethernet connector ("IEC") 16 via a category five enhanced plenum cable ("CAT5E") 22. The actuator interface module ("AIM") 20 is connected is to an actuator 24, wherein the actuator interface module 20 and the actuator 24 are mounted on the same surface. A valve assembly with a balancing damper 26 is connected to the actuator 24 for the regulation of air flow. Preferably the balancing damper in the valve assembly 26 contains an airflow sensor 27 for quantifying air flow. The flow rate across the valve assembly with the balancing damper 26 may be registered and communicated to the control unit 12 to provide feedback to an operator. The air flow sensor 27 allows for real-time measurement of the regulated cubic feet per minute in the damper 26 and relays the reading back to the control unit 12. The air regulation system 10 contains a plurality of registered jack forty-five ("RJ forty-five") jacks 38, with one RJ forty-five jack 38A (shown in FIG. 2) located on the control unit 12, one RJ forty-five jack 38B (shown in FIG. 3) on the actuator interface module 20, two RJ forty-fives jacks 38C and 38D on the industrial ethernet connector 16 to facilitate connection of the components via the CAT5E plenum cable 22 and the coiled network connector cable 18.

Figure 2:
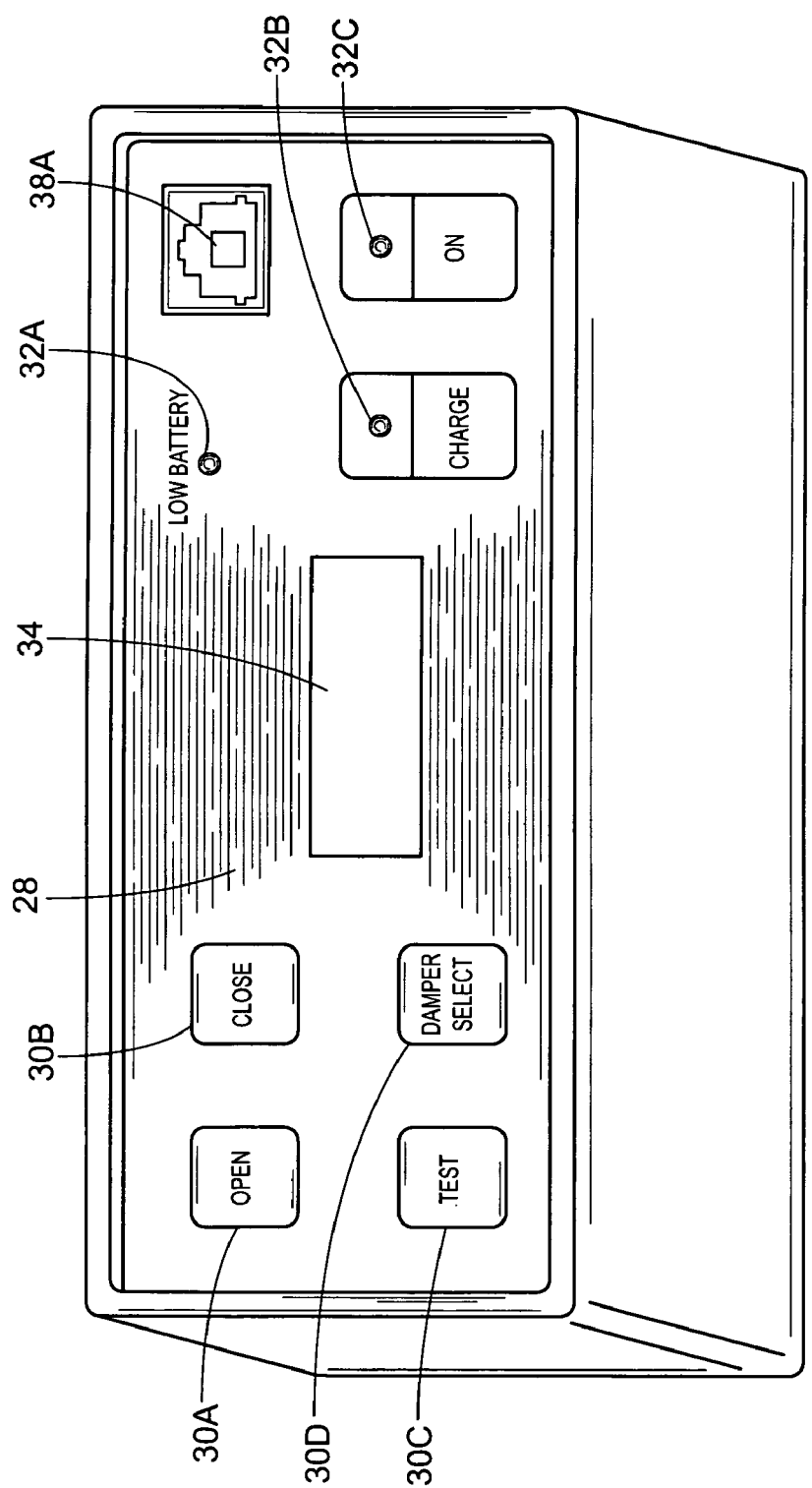
FIG. 2 is a diagrammatic perspective view of the control unit.

FIG. 2 illustrates the control unit 12 which is the intelligence and command center of the localized controlled air regulation system 10 and allows for simple adjustment of the valve assembly 26. The control unit 12 includes a front panel 28 with an open terminal push button 30A and a close terminal push button 30B to enable a technician to control the air regulation system 10. When the technician presses the open terminal push button 30A or the close terminal push button 30B for two seconds, the directional assignment places the balancing damper in the valve assembly 26 into automatic travel until reaching a fully opened or closed position. A test terminal push button 30C allows for testing of the actuator interface module 20 and/or the actuator 24 to ensure proper operation after installation of the air regulation system 10. A failed test prevents the actuator 24 from modulation. A damper select terminal push button 30D allows for the option to control more than one valve assembly 26 from the control unit 12. The front panel 28 includes several light-emitting diode ("LED") indicators 32, in particular a low battery LED 32A, a charge LED 32B, for when the control unit 12 is re-charged, and an on LED 32C indicating that the control unit 12 is operational. A liquid crystal display ("LCD") screen 34 located on the front panel 28 of the control unit 12 acknowledges all actions performed, for example, opening or closing the valve assembly 26. The LCD screen 34 also displays the results of all tests run by the control unit 12, including whether the actuator interface module 20 is functioning properly. Additionally, the LCD screen 34 also displays the real time cubic feet per second measurement when utilizing the air flow sensor 27. A pair of twelve volt batteries 36A and 36B (shown in FIG. 4) and a one hundred-twenty volt input twelve volt output battery charger 36C (shown in FIG. 4) provides the necessary power supply to the control unit 12. The RJ forty-five jack 38A located on the front panel 28 allows for connection of the coiled network connector cable 18. Alternatively, a digital wireless transmitter 40 (shown in FIG. 4) controls the valve assembly 26 via the control unit 12 from a remote location. Preferably, the wireless transmitter 40 is located within one hundred fifty linear feet from the control unit 12.

Figure 3:
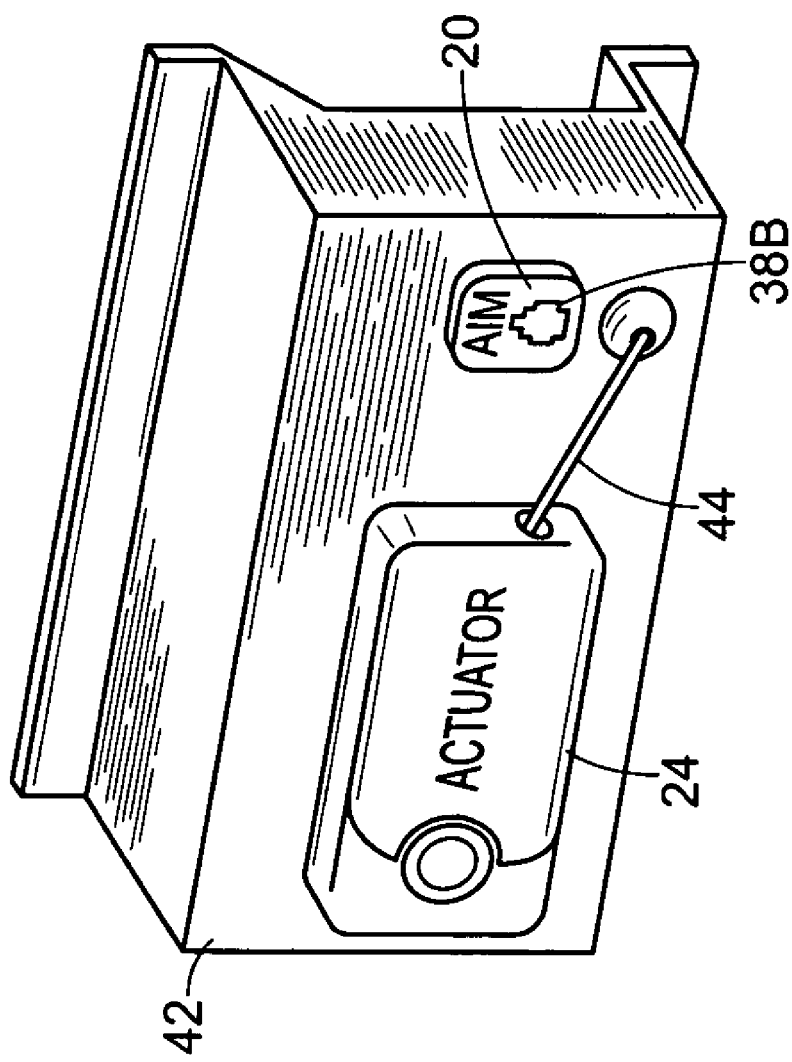
FIG. 3 is a diagrammatic perspective view of the actuator interface module and an actuator.

FIG. 3 illustrates the actuator interface module 20 and the actuator 24, wherein the actuator interface module 20 and the actuator 24 are mounted on a surface plate 42. The actuator interface module 20 provides modular interface with the control unit 12, when testing of the individual components, and all cabling, for example the coiled network cable connector 18. The actuator interface module includes one RJ forty-five jack 38B that allows for connection to the air distribution device 14 via the CAT5E plenum cable 22. The actuator interface module 20 is mounted on a surface plate 42 with the actuator 24 to provide component stability and simple on-site installation of the air regulation system 10. The modular cabling 44 connects the actuator 24 to the actuator interface module 20 for control of the valve assembly 26.

Figure 4:
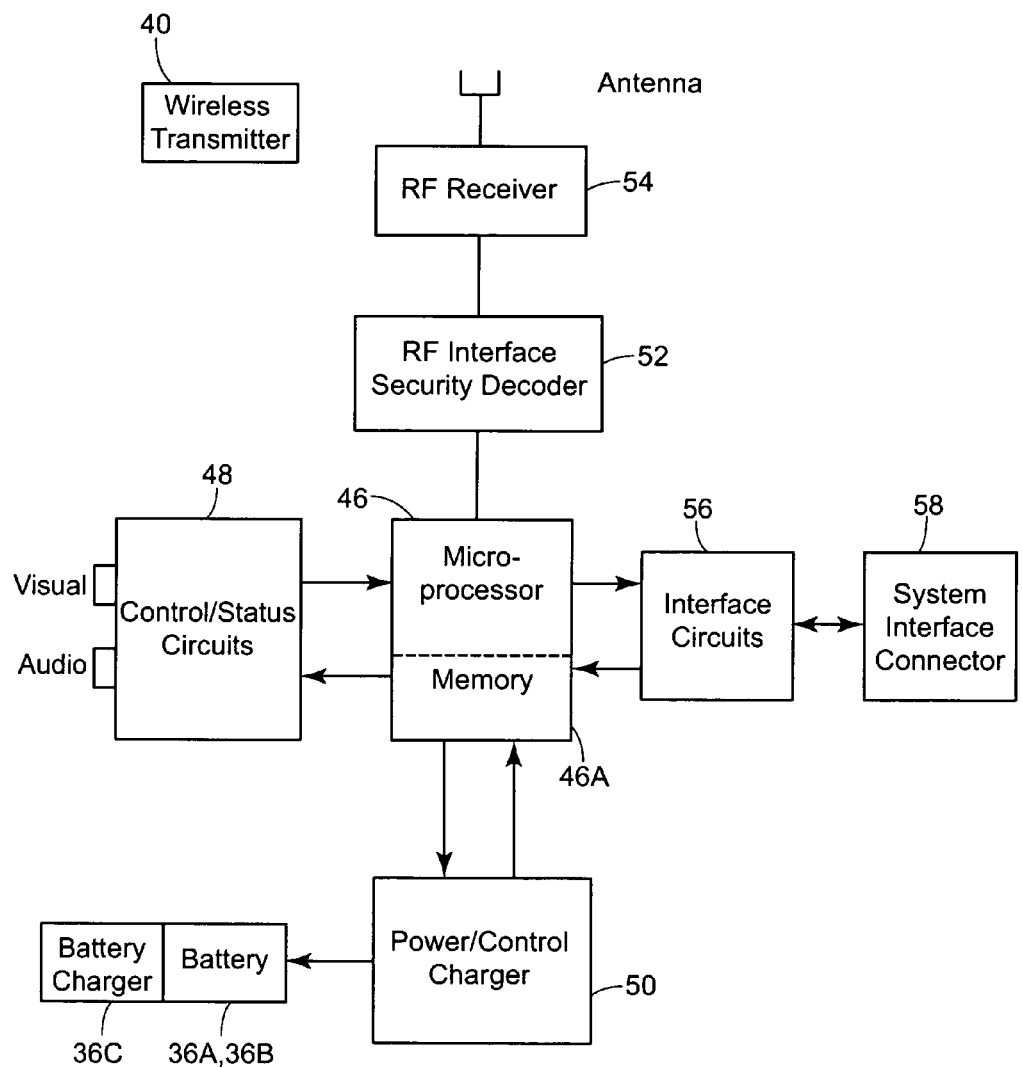
FIG. 4 is an illustrative block diagram of the control unit.

FIG. 4 illustrates a block diagram for the control unit 12. The control unit 12 includes a microprocessor 46 and an associated memory 46A. The microprocessor 46 performs numerous functions such as recognizing connected components of the air regulation system 10, charging the pair of twelve volt batteries 36A and 36B, and establishing communication with the air regulation system 10. Further, the microprocessor 46 executes commands to open and close the actuator 24, to determine if the actuator interface module 20 attached to the air regulation system 10 is valid by performing a security check, and also communicating with the wireless transmitter 40.

The microprocessor 46 executes several functions as a result of commands received from either control/status circuits 48 or from the wireless transmitter 40. The control/status circuits 48 include the terminal push buttons 30A, 30B, 30C and 30D, along with the LED indicators 32A, 32B and 32C, and the LCD display 34. The control unit 12 includes a power control/charger 50 that receives power from the pair of twelve volt batteries 36A and 36B. The power control/charger 50 measures the condition of the pair of twelve volt batteries 36A and 36B and distributes power to the microprocessor 46, along with charging the pair of twelve volt batteries 36A and 36B under the control of the microprocessor 46. Alternatively, a radio frequency interface security decoder ("RF Interface Security Decoder") 52 accepts commands to either open or close the actuator 24 from the wireless transmitter 40 via a radio frequency receiver ("RF Receiver) 54. The control unit 12 also contains interface circuits 56 which send power through a system interface connector 58 which consists of the RJ forty-five 38A jack, to a hub unit 60 (shown in FIG. 6) or the actuator interface module 20. The interface circuits 56 transmit and receive data, including commands, status and security information through the hub unit 60 or the actuator interface module 20. The interface circuits 56 send power to open and close the actuator through the system interface connector 58. The system interface connector 58 which consists of the RJ forty-five jack 38A is preferably an eight positions eight conductors modular connector with eight pins used to provide power, open-close current and data communication between the components of the air regulation system 10. The pin connection assignments for the eight positions eight conductors are: pin 1—common return; pin 2—common return; pin 3—data A; pin 4—open drive signal; pin 5—open drive signal; pin 6—data B; pin 7—close drive signal; pin 8—close drive signal. Pins 1-2, 4-5 and 7-8 are in parallel to improve current carrying capability. Pins 3 and 6 are a balanced pair used for bi-directional data communications. Preferably the control unit 12 contains digital encryption.

Figure 5:
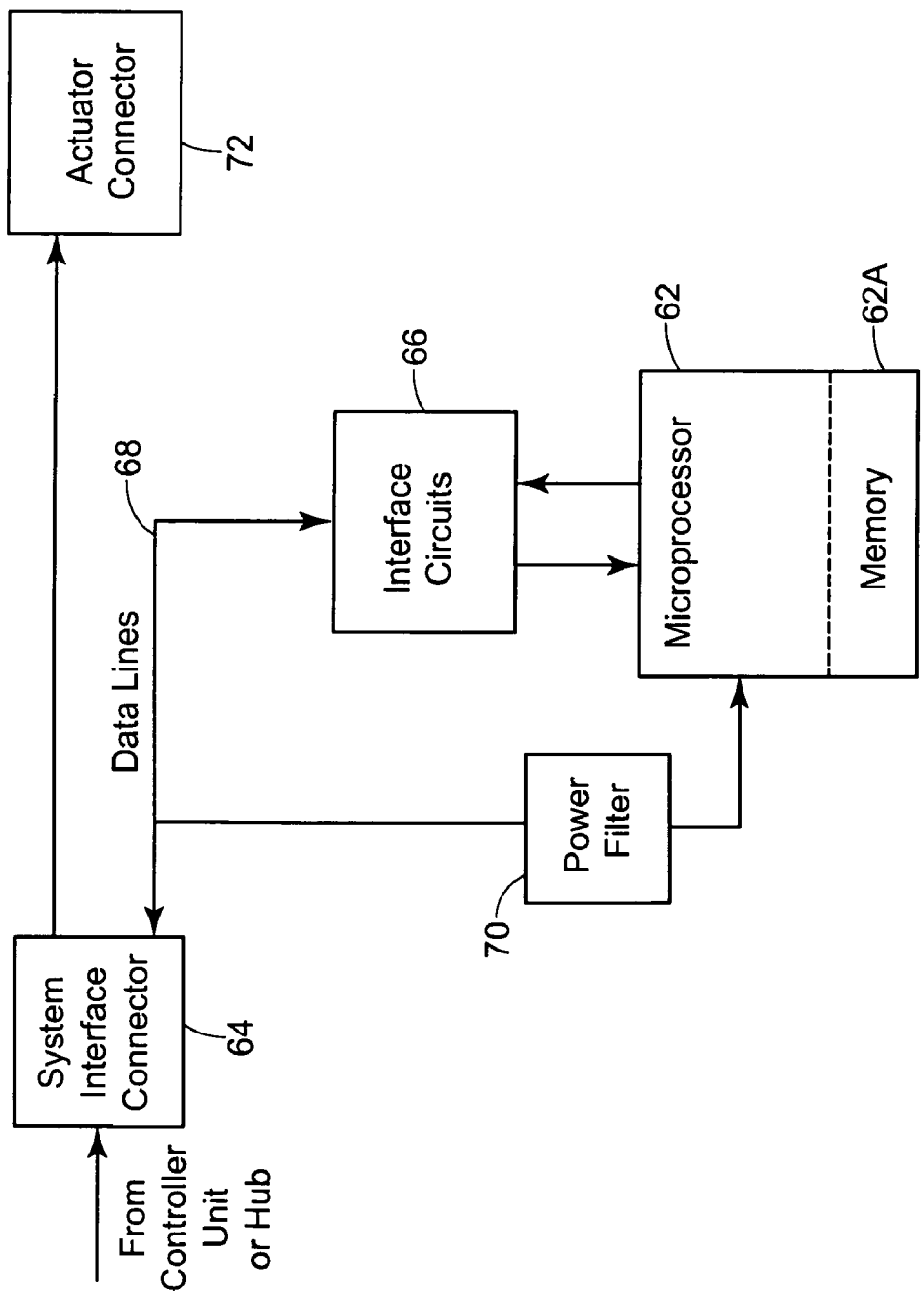
FIG. 5 is an illustrative block diagram of the actuator interface module.

FIG. 5 illustrates a block diagram for the actuator interface module 20. The actuator interface module 20 includes a microprocessor 62 and an associated memory 62A.

The microprocessor 62 performs numerous functions such as establishing communication between the control unit 12 and the actuator 24 along with performing a security check for matching the control unit 12 with the actuator interface module 20.

Figure 6:
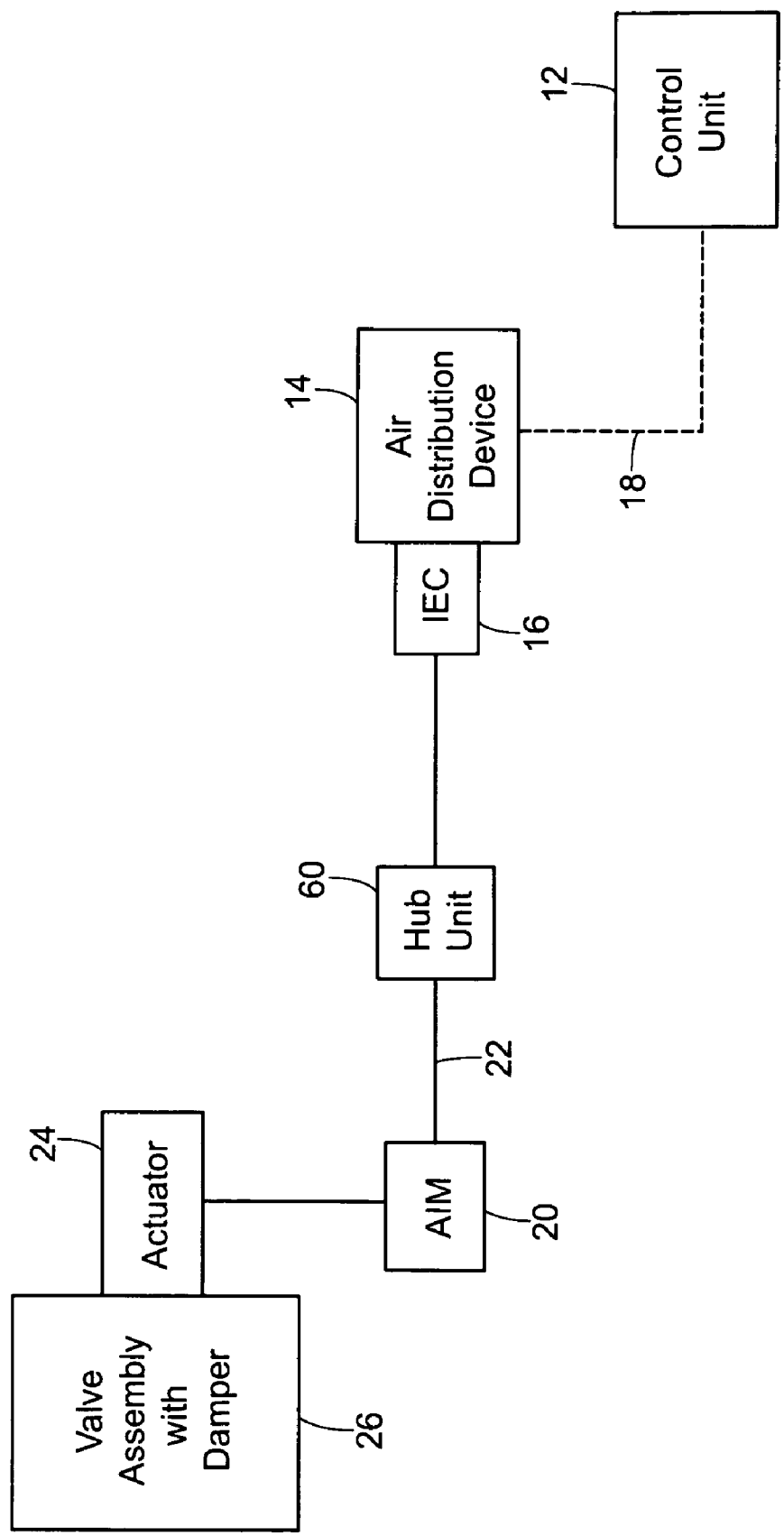
FIG. 6 is an illustrative block diagram of the present invention having a control unit, an actuator interface module and a valve assembly, and further including a hub unit for controlling multiple valve assemblies.

The microprocessor 62 executes the functions of the actuator interface module 20 as a result of commands received from the control unit 12 or the hub unit 60 (shown in FIG. 6). The microprocessor 62 of the actuator interface module 20 initially responds to the commands from either the control unit 12 or hub unit 60 with security codes that identify the control unit 12 as part of the overall air regulation system 10. The actuator interface module 20 includes a system interface connector 64 which consists of the RJ forty-five 38B jack and interface circuits 66. The data lines 68 connect the system interface connector 64 and the interface circuits 66, and allow for data to flow from the microprocessor to the actuator 24 through the system interface connector 64. The data lines 68 separate the commands and responses from the power that is received from the control unit 12 via the system interface connector 64. A power filter 70 separates the power from the data, both of which are received from the control unit 12, and travel back and forth between the microprocessor 62. Although, the power and data both flow through the data lines 68, the power filter 70 allows for the power and data to be separate. An actuator connector 72 directly connects the actuator interface module 20 to the actuator 24, and allows for current to pass through from the system interface connector 64 to open or close the actuator 24. Preferably the actuator interface module 20 contains digital encryption.

FIG. 6 illustrates a block diagram for the air regulation system 10 that further includes the hub unit 60 for controlling multiple valve assemblies 26. The hub unit 60 allows up to eight valve assemblies 26 to be operated via the control unit 12. The hub unit 60 contains one RJ forty-five jack 38E (shown in FIG. 7) to allow connection to the industrial ethernet connector 16 located in the air distribution device 14 via the CAT5E plenum cable 22. The hub unit 60 is individually connected to each valve assembly 26 via the actuator interface module 20 by the CAT5E plenum cable 22 at the RJ forty-five jack 38 (shown in FIG. 7) located on the hub unit 60.

Figure 7:
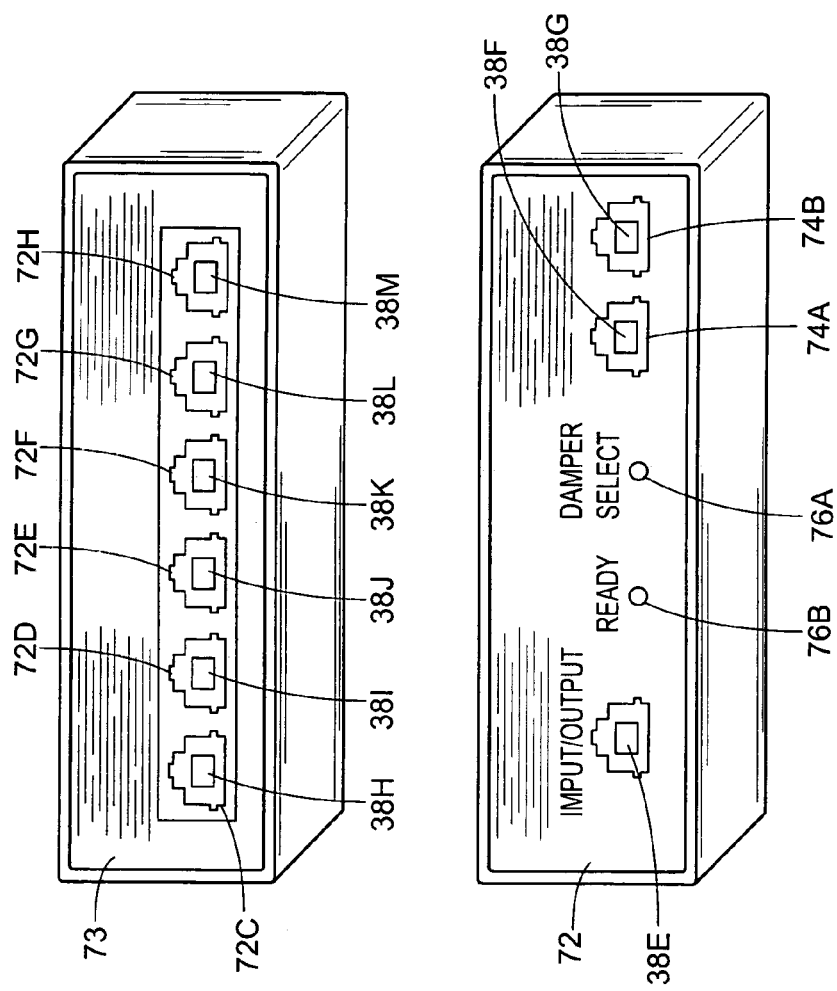
FIG. 7 is a diagrammatic perspective view of the hub unit.

FIG. 7 illustrates the hub unit 60. The hub unit 60 allows for operation of up to eight valve assemblies 26 via the control unit 12. Preferably the hub unit 60 controls eight valve assemblies 26. Alternatively, the hub unit 60 controls six valve assemblies 26. The hub unit includes a front panel 72 that contains two ports 74A and 72B, and a back panel 73 that contains six ports 72C, 72D, 72E, 72F, 72G, 72H. Each port includes the RJ forty-five jack 38F 38G, 38H, 38I, 38J, 38K, 38L, 38M to allow for connection of the CAT5E plenum cable 22 to the hub unit 60. The front panel 72 also includes light emitting diode ("LED") indicators 76, in particular a damper select Led 76A that illuminates when communicating with any valve assembly 26 and a ready LED 76B that indicates connection to the control unit 12.

Figure 8:
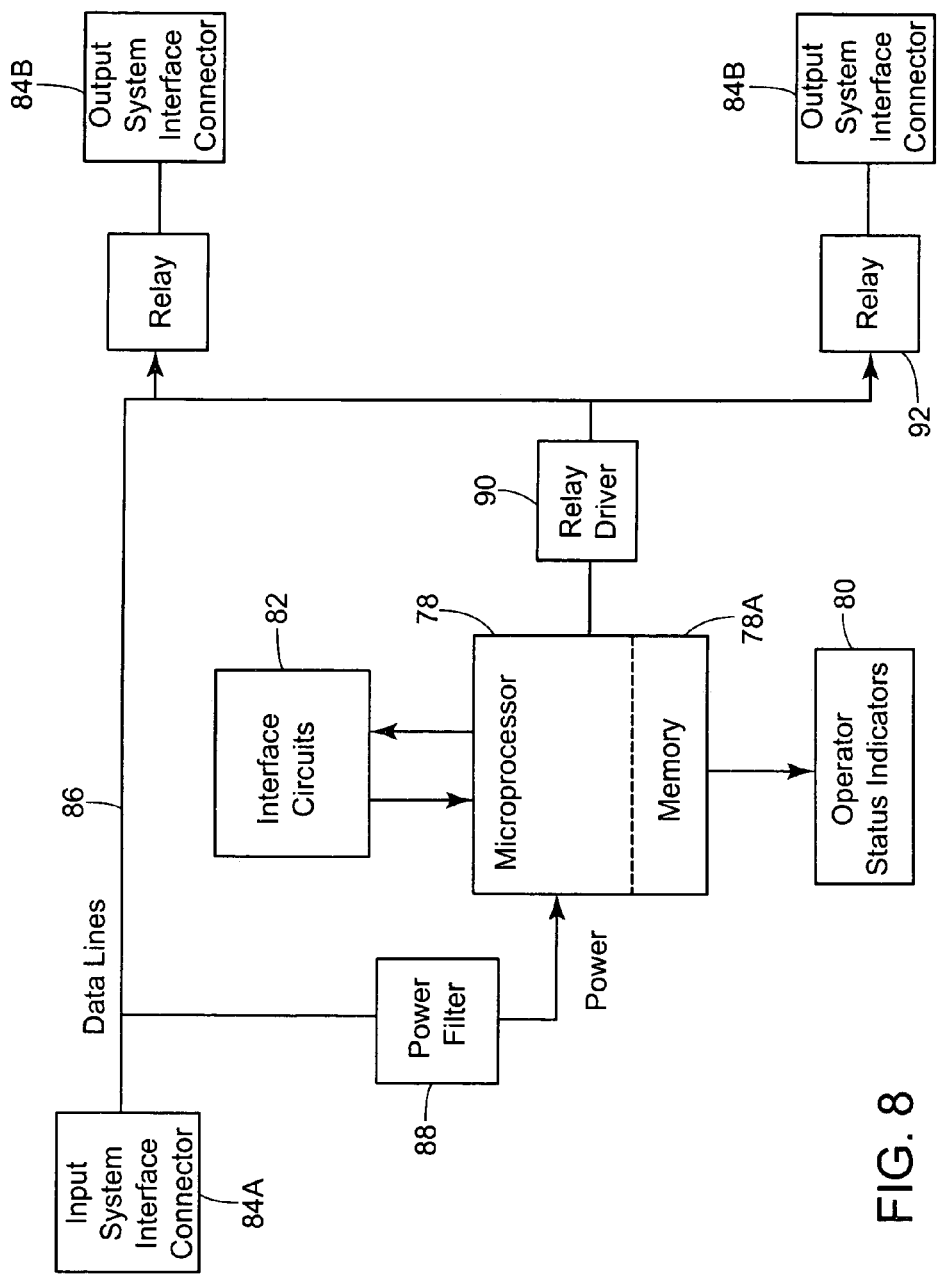
FIG. 8 is an illustrative block diagram of the hub unit.

FIG. 8 illustrates a block diagram for the hub unit 60. The hub unit 60 includes a microprocessor 78 and an associated memory 78A. The microprocessor 78 performs numerous functions such as establishing communication with the actuator interface module 20 and performing a security check to determine if there is a valid control unit 12 and actuator interface module 20 connected to the hub unit 60. The microprocessor also receives signals from the control unit 12 signaling which valve assembly to open or close via the actuator interface module 20. Moreover, the microprocessor 78 of the hub unit 60 passes all communications between the control unit 12 and the selected actuator interface module 20 including current to open or close the actuator 24.

The microprocessor 78 executes the functions of the hub unit 60 as a result of commands received from the control unit 12. The hub unit 60 includes operator status indicators 80 that consist of the LED indicators 76A and 76B to ensure proper communication between the hub unit 60 and the control unit 12, and the hub unit 60 and the actuator interface module 20. The hub unit 60 includes interface circuits 82 and an input system interface connector 84A which consists of the RJ forty-five jack 38C for connection to the industrial ethernet connector 16 via the CAT5E plenum cable 22. The data lines 86 connect the input system interface 84A and the interface circuits 82, and allow for data to flow from the control unit 12 to the microprocessor 78 in the hub unit 60. The data lines 86 separate the commands and responses from the power that is received from the control unit 12 via the input system interface connector 84A. A power filter 88 separates the power from the data, both of which are received from the control unit 12 and travel back and forth between the microprocessor 78 in the hub unit 60. Although the power and data both flow through the data lines 86, the power filter 88 allows for the power to be separate and pass through the microprocessor 78. A relay driver 90 connects the microprocessor 78 of the hub unit 60 to eight output system interface connectors 84B, wherein each output system interface connector 84B consist of the RJ forty-five 38 jack for connection to the actuator interface module 20. Each output system interface connector 84B receives power from the microprocessor through relays 92, wherein each output system connector interface 84B contains one relay 92. The relay driver 90 generates the power needed to actuate the relays 92 as a result of the command from the microprocessor 78 of the hub unit 60. Only one output connector 84B is connected at a time; however, the relays 92 connect all the lines of each output system interface connector 84B. Each output system interface connector consists of the RJ forty-five jack 38, which is preferably an eight positions eight conductors modular connector, wherein the assignment of the positions is as follows: data pair, close pair, open pair, common return.

Figure 9:
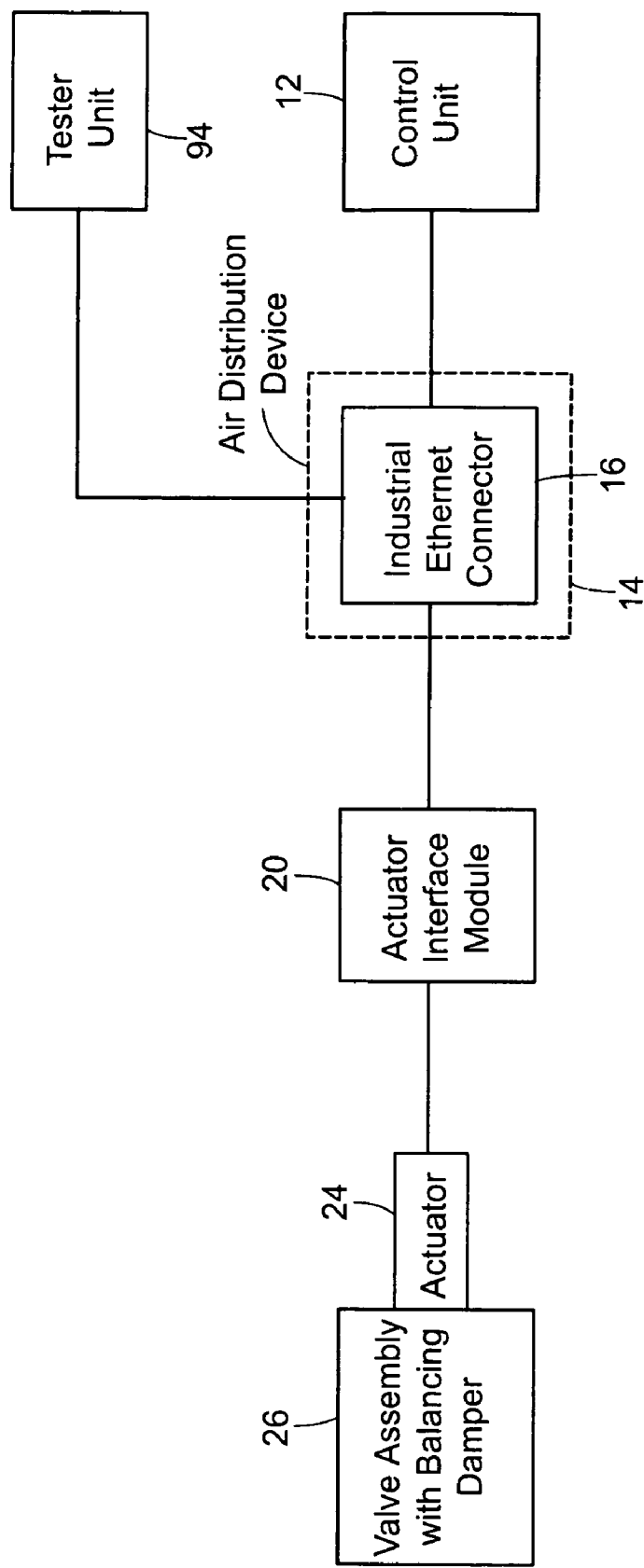
FIG. 9 is an illustrative block diagram of the present invention having a control unit, an actuator interface module and a valve assembly, and a tester unit for ensuring proper functioning of each system component.

FIG. 9 illustrates the air regulation system 10 that further includes a tester unit 94. The tester unit 94 is designed to test all cabling, including the CAT5E plenum cable 22, and the RJ forty-five jacks 38 to ensure proper functioning. The tester unit 94 also makes a direction connection with the actuator interface module 20 via the CAT5E plenum cable 22 to ensure proper operation after installation of the air regulation system 10.

Figure 10:
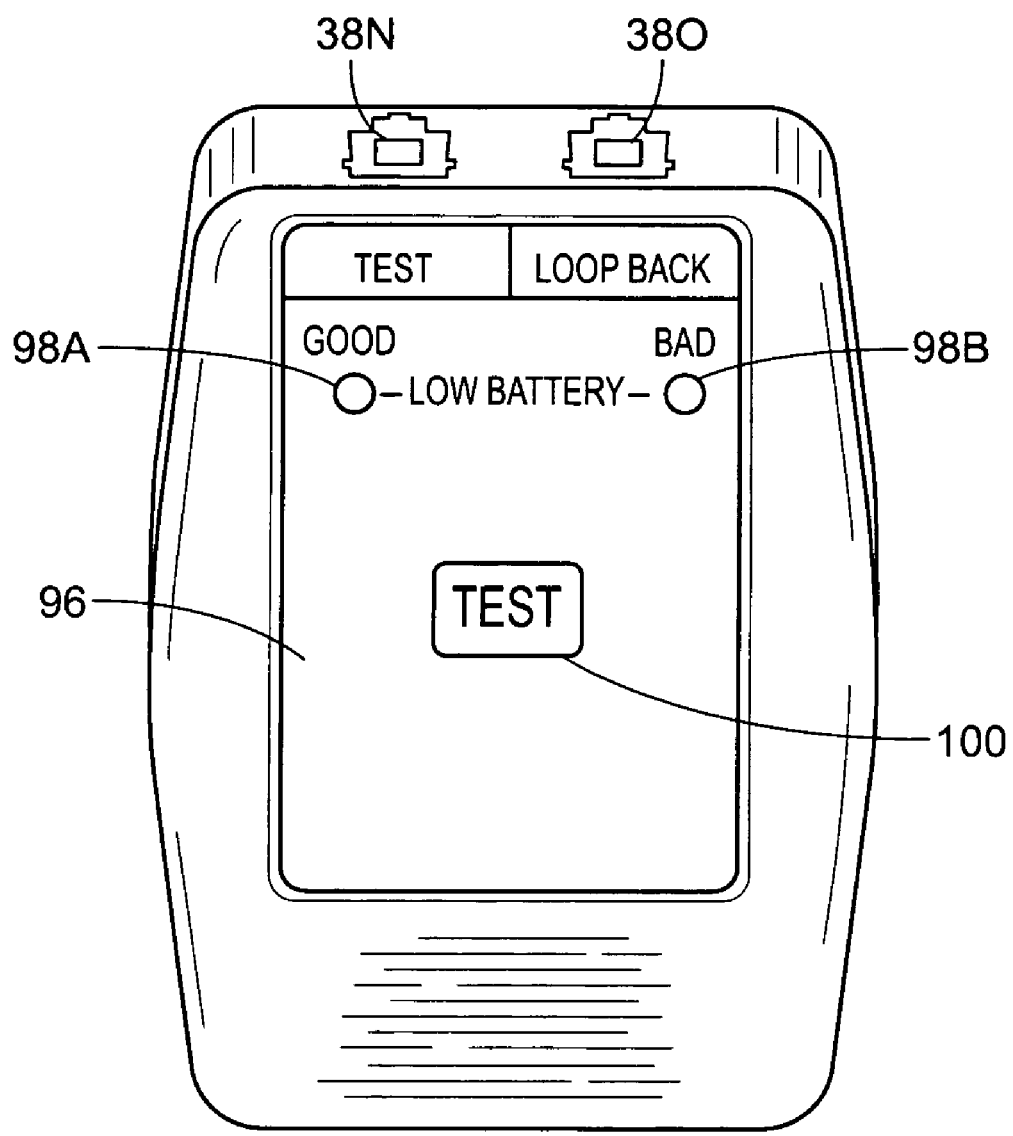
FIG. 10 is a diagrammatic perspective of the tester unit.

FIG. 10 illustrates the tester unit 94. The tester unit includes a front panel 96 that contains LED indicators 98, in particular a good LED 98A and a bad LED 98B which indicates the level of operation of a particular component of the air regulation system 10. The tester unit 94 provides two distinct audio responses to allow an operator to know the status of the components being tested. Preferably other like audio signaling is contemplated. The tester unit 94 is also designed to have both LED indicators 98A and 98B illuminate when the pair of twelve volt batteries 36A and 36B are low on power. The tester unit 94 contains two RJ forty-five 38N and 38O jacks for testing of any cabling or other RJ forty-five jacks 38 in the air regulation system 10. The pair of RJ forty-five 38N and 38O jacks on the tester unit allow for cabling to be tested by plugging both ends of the cable into the RJ forty-five jacks 38N and 38O. A test push terminal button 100 located on the front panel of the tester unit, allows for an operator to test any component of the air regulation system 10 once the proper connection is made with the tester unit 94.

Figure 11:
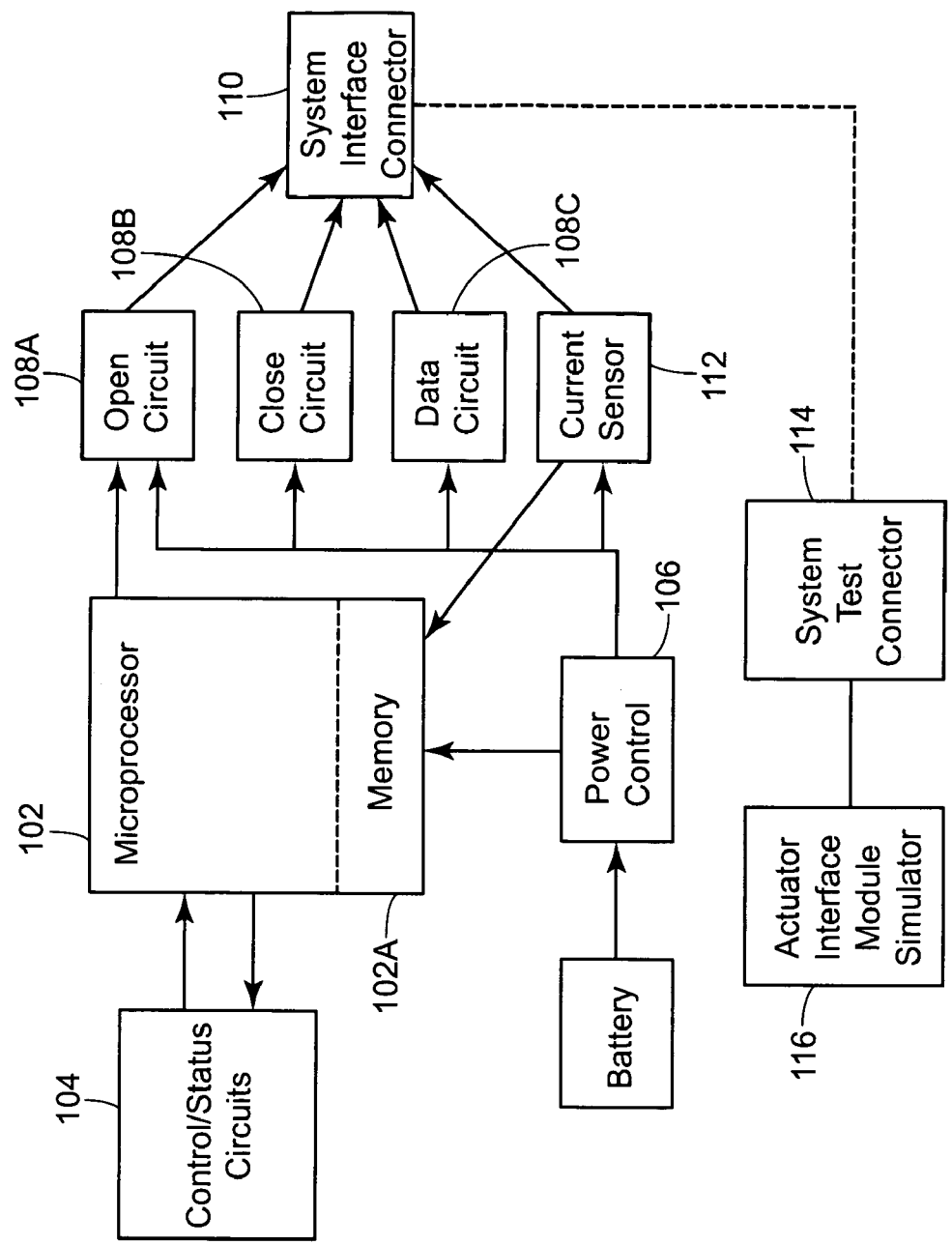
FIG. 11 is an illustrative block diagram of the tester unit.

FIG. 11 illustrates a block diagram for the tester unit 94. The tester unit 94 includes a microprocessor 102 and associated memory 102A. The microprocessor 102 of the tester unit 94 performs numerous functions such as checking the condition of the pair of twelve volt batteries 36A and 36B, testing to open or close the actuator 24 and testing all cabling of the air regulation system 10, including the CAT5E plenum cable 22.

The tester unit 94 executes several functions as a result of commands received from an operator via control/status circuits 104. The control/status circuits 104 include the LED indicators 98A and 98B which indicate a good or bad test and the test push terminal button 100. The tester unit 94 receives power from self contained alkaline batteries and includes power controls 106 which measures the condition of the batteries and distributes power to the microprocessor 102. A plurality of circuits 108, in particular an open circuit 108A, a close circuit 108B and a data circuit 108C send current to a system interface connector 110 from the microprocessor 102 of the tester unit 94. The open circuit 108A applies open current to the actuator interface module 20 during connection with the system interface connector 110 to check for proper circuit characteristics of the CAT5E cable 22, actuator interface module 20 and the actuator 24. The close circuit 108B applies close current to the actuator interface module 20 during connection with the system interface connector 110 to check for proper circuit characteristics of the CAT5E cable 22, actuator interface module 20 and the actuator 24. The data circuit 108C applies current to the data signals of the CAT5E plenum cable 22 via the system interface connector 110 to check for proper circuit characteristics of the CAT5E plenum cable 22 and the actuator interface module 20. A current sensor 112 detects current flow in the open circuit 108A, the close circuit 108B and the data circuit 108C to determine whether the circuits 108 possess continuity when current is applied. The system interface connector 110 which consists of the RJ forty-five 38N jack is used to connect to the actuator interface module 20 being tested. When cabling is being tested, a system test connector 114 is used to connect the cable, for example CAT5E plenum cable 22 to an actuator interface module simulator 116 where the circuit creates the impedance loads that are similar to the actuator interface module 20 and actuator 24, to determine proper cable functioning.

Now that a user understands the physical components of the air regulation system 10 through block diagrams of the individual parts including the control unit, actuator interface module, hub unit and tester unit, the discussion will turn to the communication between the parts of the air regulation system 10 through operational system flowcharts.

Figure 12:
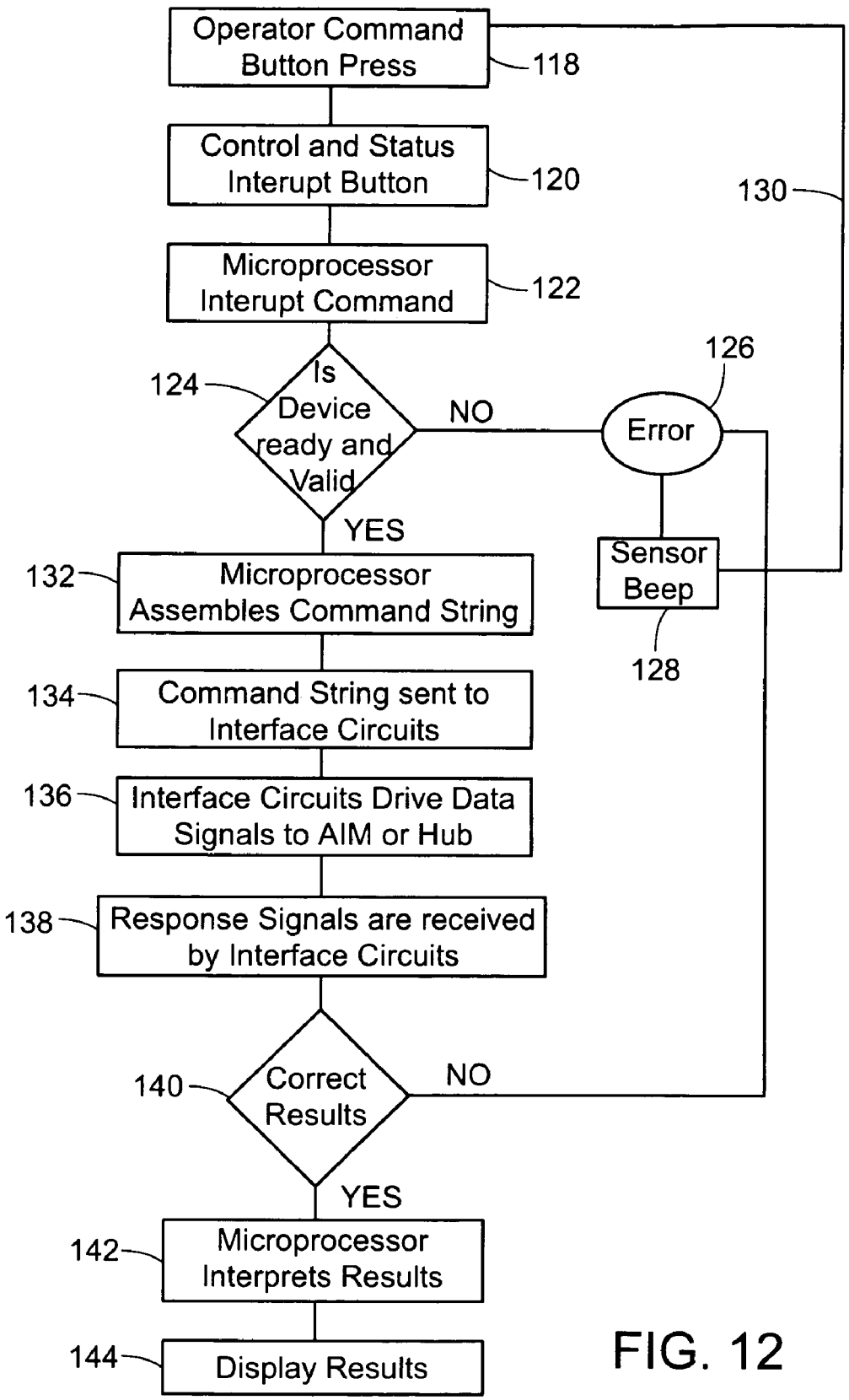
FIG. 12 is an illustrative operational system flowchart for data communication between the control unit and the actuator interface module or hub unit.

FIG. 12 illustrates an operational system flowchart for data communication between the control unit 12 and the actuator interface module 20 or the hub unit 60 via the system interface connector 58 of the control unit 12. The purpose of the data communication is to interrogate the control unit 12 for proper operation, configuration, serial number and vendor security codes between the control unit 12 and either the actuator interface module 20 or the hub unit 60.

The data communication begins at step 118 wherein an operator gives a command to the control unit 12 by pressing one of the terminal push buttons 30A, 30B, 30C and 30D on the front panel 28 of the control unit 12. At step 120, the control/status circuits 48 interpret the command given by the operator, for example to open or close the actuator 24. At step 122, the microprocessor 46 of the control unit 12 interprets the command given by the operator. At step 124, when the device is not ready and valid then an error message appears at step 126 and is shown on the LCD screen 34 of the control unit 12. This ensures that both the control unit 12 and the actuator interface module 20 or hub unit 60 are recognizable to one another and in communication with one another. At step 128, a sensor makes an audible beep to further indicate there is an error the device is not ready and valid. At step 130, the command returns to the main loop, wherein the operator gives the control unit 12 another command when an error has occurred. Alternatively, at step 132 the microprocessor 46 assembles the command string when the device is ready and valid to receive the command from the microprocessor 46. At step 134, the microprocessor 48 sends the command string to the interface circuits 56 of the control unit 12. At step 136 once the interface circuits 56 receive the command string, the interface circuits 56 drive data signals to either the actuator interface module 20 or the hub unit 60. At step 138, response signals are received from either the actuator interface module 20 or the hub unit 60 by the interface circuits 56 of the control unit 12. At step 140, when there is not a correct response, the error message at step 126 occurs and the command returns to the main loop, wherein the operator gives a new command at step 118. Alternatively, at step 142, when the interface circuits 56 receive a correct response, the microprocessor 46 interprets the response and displays the results of the command at step 144.

Figure 13:
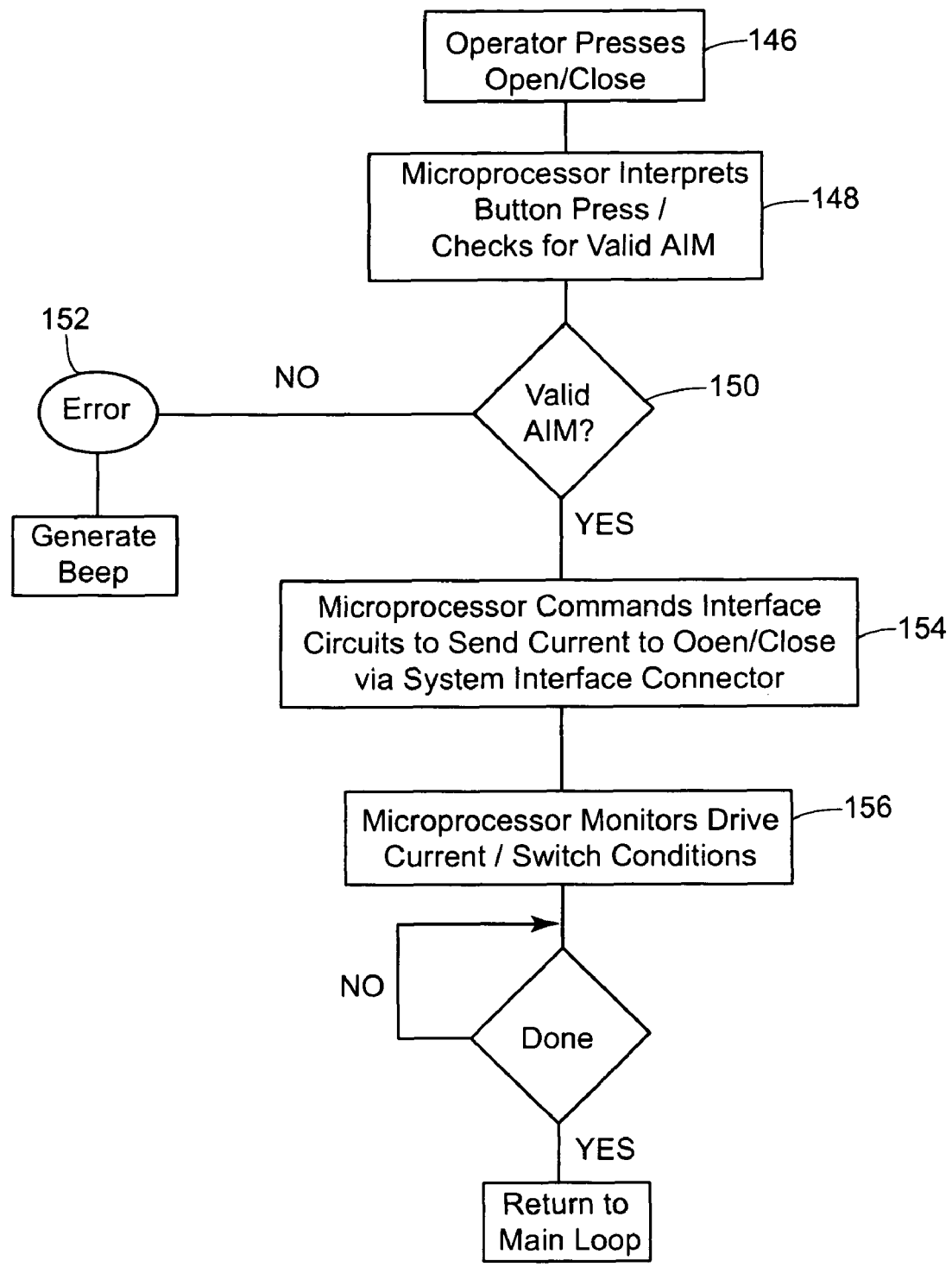
FIG. 13 is an illustrative operational system flowchart for activation of the actuator interface module via the control unit.

FIG. 13 illustrates an operational system flowchart for activation of the actuator interface module 20 via the control unit 12. At step 146, the operator gives a command to the control unit 12 by pressing one of the terminal push buttons to either open or close the actuator 24. At step 148, the microprocessor 46 of the control unit 12 interprets the button pressed by the operator. At step 150 the microprocessor 46 determines whether the actuator interface module 20 connected to the air regulation system 10 may receive and communicate with the control unit 12. At step 152 an error message will occur on front panel 28 of the control unit 12 when the actuator interface module 20 is not valid. Alternatively, at step 154 when there is a valid actuator interface module 20 connected to the air regulation system 10, the microprocessor 46 commands the interface circuits 56 to send current to open or close the actuator 24. The microprocessor 46 sends the current to open or close the actuator 24 via the eight positions eight connectors modular connector that is located in the system interface connector 58 of the control unit 12. At step 156 until the command is completed, the microprocessor 46 monitors the drive current.

Figure 14:
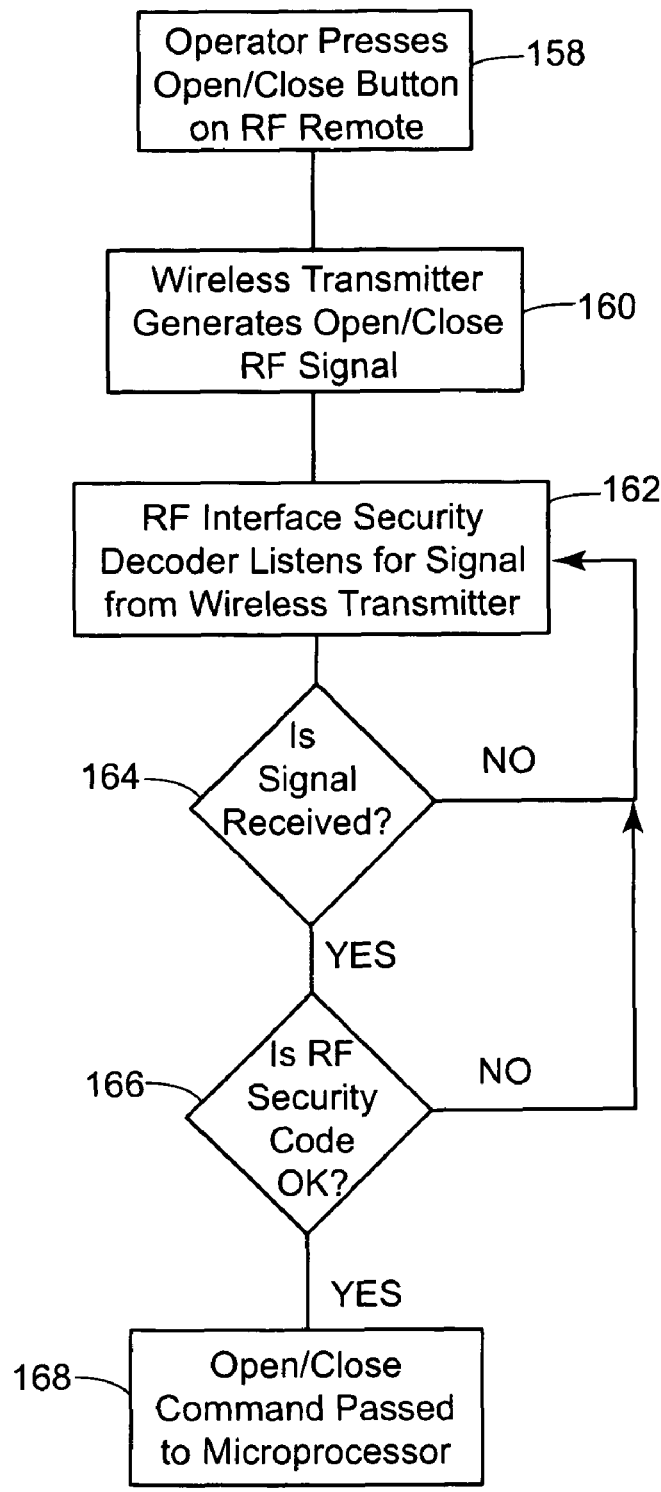
FIG. 14 is an illustrative operational system flowchart for communication between a wireless transmitter and the control unit.

FIG. 14 is an operational system flowchart for communication between the wireless transmitter 40 and the control unit 12. At step 158, the operator presses a button on the wireless transmitter 40 to either open or close the actuator 24. At step 160, the wireless transmitter 40 generates an open or close radio frequency signal to antennas located on the wireless transmitter 40. At step 162, the radio frequency interface security decoder 52 is listening for a signal from the wireless transmitter 40 via the radio frequency receiver 54. At step 164, when the signal is not received, the radio frequency receiver 54 continues to listen for a signal from the wireless transmitter 40. Alternatively, at step 166, when the signal is received by the radio frequency interface security decoder 52, the radio frequency security code must be acceptable. Again, when the security code is not accepted, then the radio frequency receiver 54 continues to listen for a signal from the wireless transmitter 40. Alternatively, at step 168, when the security code is acceptable, the radio frequency interface security decoder 52 passes the command to the microprocessor 48 of the control unit 12.

Figure 15:
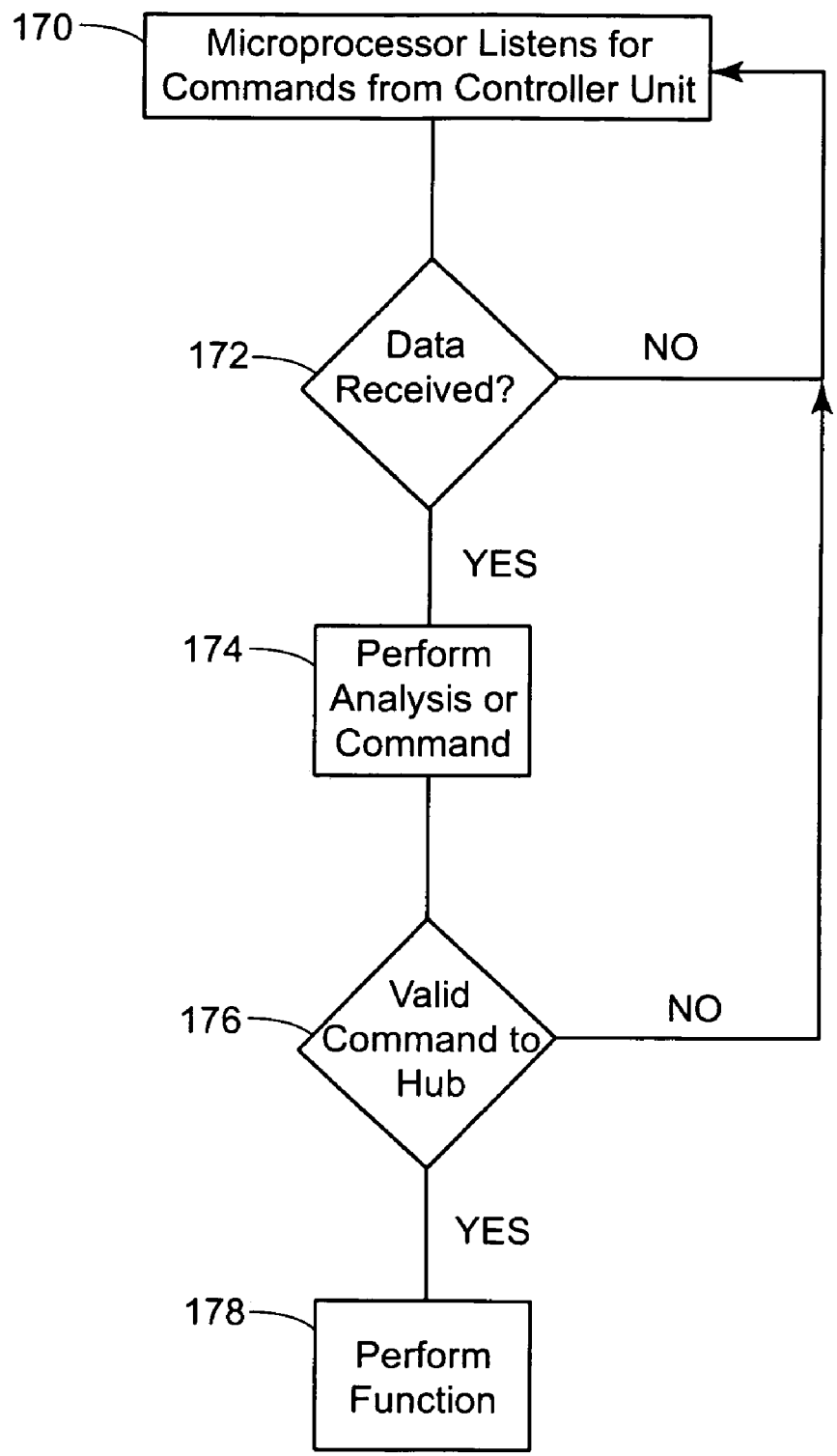
FIG. 15 is an illustrative operational system flowchart for the hub unit.

FIG. 15 illustrates an operational system flowchart for the hub unit 60. At step 170, the microprocessor 78 of the hub unit 60 listens for commands that are received from the control unit 12 via the interface circuits 82 of the hub unit 60. At step 172, when the command is not received, the interface circuits 82 continue to listen to commands from the control unit 12. Alternatively, at step 174, when the data is received, the microprocessor 78 performs an analysis of the command. At step 176, the microprocessor 78 determines whether this is a valid command for the hub unit 60 to perform once analysis of the command is complete. When the command is not valid, the interface circuits 82 continue to listen for a new and valid command from the control unit 12. Alternatively, at step 178, when the command is valid the microprocessor 78 of the hub unit 60 performs the command received from the control unit 12.

Figure 16:
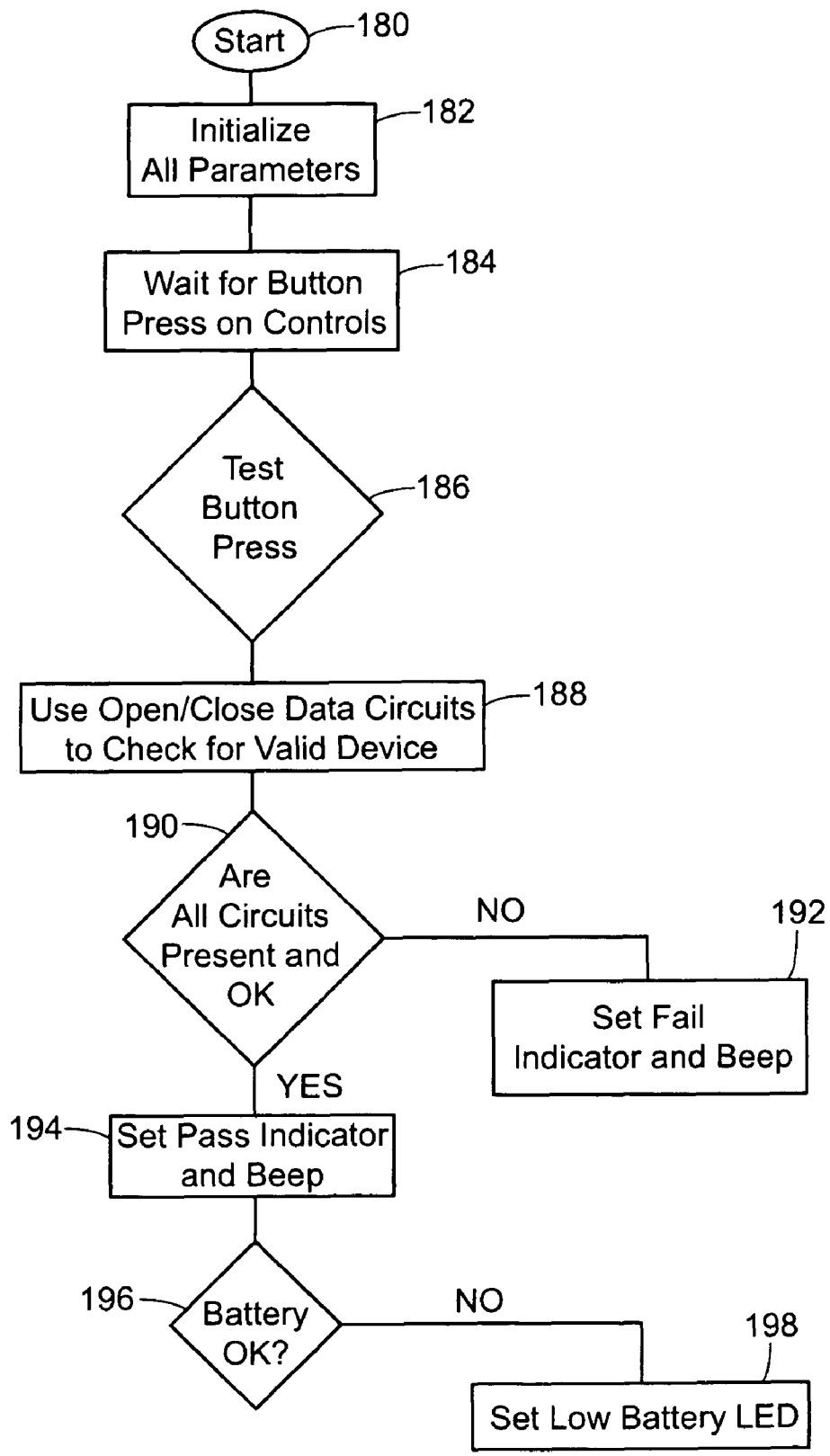
FIG. 16 is an illustrative operational system flowchart for the tester unit.

FIG. 16 illustrates an operational system flow chart for the tester unit 94. At step 180, the tester unit 94 is connected to one component of the air regulation system 10 to begin testing for valid use. At step 182, all parameters for performing tests of the various components of the air regulation system 10 are initialized. Once all parameters for testing have been initiated, at step 184 the operator waits to press the test button on the tester unit 94. At step 186, the operator presses the test button on the tester unit 94 to determine whether components of the air regulation system are functioning properly after installation. When the test button is pressed, at step 188 the open/close data circuits check the component being tested to determine if it is a valid device. At step 190, when all the circuits are not present and valid, then the bad LED 98B will illuminate on the tester unit 94 at step 192. Alternatively, at step 194, when all the circuits are present and valid the good LED 98A will illuminate on the tester unit 94. At step 196, the pair of twelve volt batteries 36A and 36B are checked by the tester unit 94 to determine if they are functioning. The bad LED 98B will illuminate at step 198 if there is a low battery.

Figure 17:
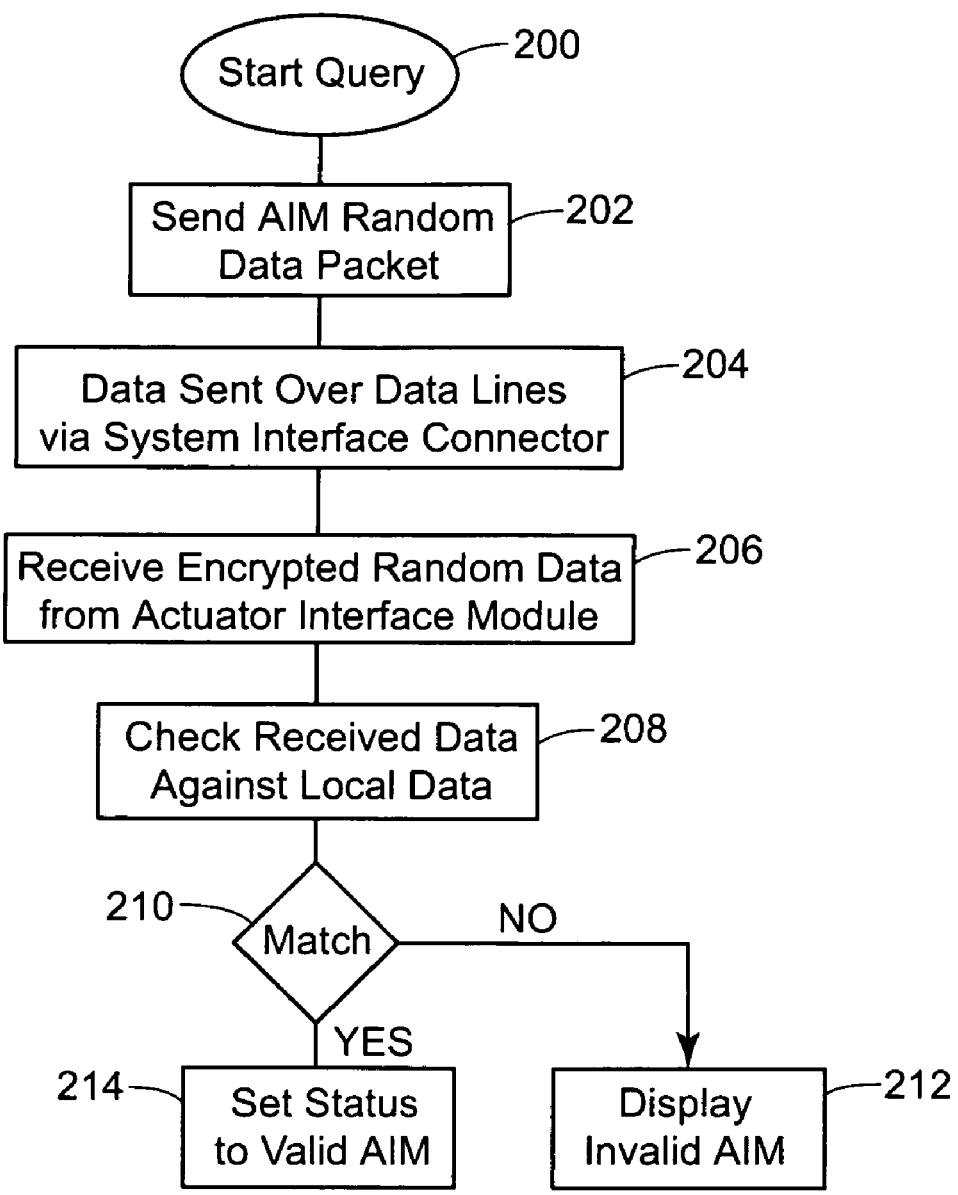
FIG. 17 is an illustrative operational system flowchart detailing the security challenges associated with the air security system.

FIG. 17 illustrates an operational system flowchart for the security measures of the air regulation system 10 that verifies the correct vendor code and runs an encryption code to make sure each component is not a clone. At step 200, a status query is performed, wherein the control unit 12 sends the actuator interface module 20 a random data packet at step 202, via the data lines 68 over the system interface connector 66 at step 204. At step 206, the control unit 12 receives encrypted random data from the actuator interface module 20. At step 208, the received data from the actuator interface module 20 is checked against the local data from the control unit 12. The air regulation system 10 then determines at step 210 whether there is a match between the control unit 12 and the actuator interface module 20. At step 212, when there is not a match, the LCD screen 34 on the control unit 12 displays an invalid actuator interface module 20. When there is a match between the control unit 12 and the actuator interface module 20, the customer code is checked. When the customer code is valid, then at step 214, the status of the actuator interface module 20 is set to valid, enabling all other commands to operate.

There are several alternate embodiments in which the air regulation system 10 can be utilized. In one embodiment, the air regulation system 10 can be utilized for the regulation and control of liquid systems. In another embodiment, the air regulation system 10 can be utilized for the regulation of gas and vapor valve systems. In yet another embodiment, the air regulation system 10 can be utilized for fire damper monitoring and cycling for hospital certification. In yet another embodiment, the air regulation system 10 can be utilized for the precise regulation and measurement of fresh air when the balancing damper 26 and air flow sensor 27 is placed between a fresh air source and any residential HVAC system included with an independent blower. In yet another embodiment, the air flow sensor 27 can be utilized as a stand-alone device for reading and delivery of the air flow in cubic feet per minute only.

In conclusion, herein is presented a localized controlled air regulation system. The invention is illustrated by example in the drawing figures, and throughout the written description. It should be understood that numerous variations are possible, while adhering to the inventive concept. Such variations are contemplated as being a part of the present invention.

What is claimed is:

1. An air regulation system for making a localized connection with an air distribution device located within a building, comprising:

a control unit for allowing an operator to send commands to the air regulation system having a front panel and a registered jack forty-five jack located on the front panel;

an industrial ethernet connector located in the air distribution device having a pair of registered jack forty-five jacks for allowing the control unit to make a localized connection at the air distribution device;

a coiled network connector cable connected between the control unit and the industrial ethernet connector for allowing a connection between the control unit and the industrial ethernet connector;

an actuator interface module having a registered jack forty-five jack for providing modular interface with the control unit;

a category five enhanced plenum cable connected between the industrial ethernet connector and the actuator interface module for allowing connection between the actuator interface module and the industrial ethernet connector;

a valve assembly having a balancing damper for the regulation of air flow;

an actuator connected to the valve assembly; and a modular cable connected between the actuator interface module and the actuator for allowing a connection between the actuator and the actuator interface module.

2. The air regulation system of claim 1, wherein the front panel of the control unit includes an open terminal push button, a close terminal push button, a test terminal push button, a damper terminal push button, a low battery light-emitting diode, an on light-emitting diode, a charge light-emitting diode, a liquid crystal display screen.

3. The air regulation system of claim 2, further comprising a pair of twelve volt batteries and a one-hundred twenty volt input twelve volt output battery charger for powering the control unit.

4. The air regulation system of claim 3, further comprising a digital wireless transmitter for controlling the valve assembly via the control unit from a remote location.

5. The air regulation system of claim 4, wherein the control unit includes a microprocessor having an associated memory, a plurality of control/status circuits for sending commands to the microprocessor, a power control/charger, a radio frequency receiver for receiving signals from the wireless transmitter, a radio frequency interface security decoder for accepting signals from the radio frequency receiver, a system interface connector which consists of the registered jack forty-five jack, and a plurality of interface circuits for sending power and data through the system connector.

6. The air regulation system of claim 5, wherein the actuator interface module includes a microprocessor having an associated memory, a system interface connector which consists of the registered jack forty-five jack, a plurality of interface circuits, a plurality of data lines for connecting the system interface connector and the interface circuits in the actuator interface module, a power filter for separating power from data, an actuator connector for connecting the actuator interface module to the actuator allowing current to pass from the system interface connector to the actuator.

7. The air regulation system of claim 6, further comprising a pilot tube flow cross sensor located in the balancing damper of the valve assembly for quantifying air flow in the damper and identifying the cubic feet per minute delivery in real time on the LCD screen of the control unit.

8. An air regulation system for making a localized connection with an air distribution device located within a building, comprising:
a control unit for allowing an operator to send commands to the air regulation system having a front panel and a registered jack forty-five jack located on the front panel;
an industrial ethernet connector located in the air distribution device having a pair of registered jack forty-five jacks for allowing the control unit to make a localized connection at the air distribution device;
a coiled network connector cable connected between the control unit and the industrial ethernet connector for allowing a connection between the control unit and the industrial ethernet connector;
an actuator interface module having a registered jack forty-five jack for providing modular interface with the control unit;
a category five enhanced plenum cable connected between the industrial ethernet connector and the actuator interface module for allowing connection between the actuator interface module and the industrial ethernet connector;
a valve assembly having a balancing damper for the regulation of air flow;
an actuator connected to the valve assembly;
a modular cable connected between the actuator interface module and the actuator for allowing a connection between the actuator and the actuator interface module;
a hub unit for controlling multiple valve assemblies having a front panel and a back panel, the front panel having a registered jack forty-five jack and a pair of ports, and each port having a registered jack forty-five jack, and the back panel having six ports, each port having a registered jack forty-five jack;
a category five enhanced plenum cable connected between the industrial ethernet connector and the hub unit for allowing a connection between the hub unit and the industrial ethernet connector; and
a category five enhanced plenum cable connected between the hub unit and the actuator interface module for allowing a connection between the hub unit and the actuator interface module.

9. The air regulation system of claim 8, wherein the front panel of the control unit includes an open terminal push button, a close terminal push button, a test terminal push button, a damper terminal push button, a low battery light-emitting diode, an on light-emitting diode, and a charge light-emitting diode.

10. The air regulation system of claim 9, further comprising a pair of twelve volt batteries and a one-hundred twenty volt input twelve volt output battery charger for powering the control unit.

11. The air regulation system of claim 10, further comprising a digital wireless transmitter for controlling the valve assembly via the control unit from a remote location.

12. The air regulation system of claim 11, wherein the front panel of the hub unit includes a damper select light-emitting diode and a ready light-emitting diode.

13. The air regulation system of claim 12, wherein the control unit includes a microprocessor having an associated memory, a plurality of control/status circuits for sending commands to the microprocessor, a power control/charger, a radio frequency receiver for receiving signals from the wireless transmitter, a radio frequency interface security decoder for accepting signals from the radio frequency receiver, a system interface connector which consists of the registered jack forty-five jack, and a plurality of interface circuits for sending power and data through the system connector.

14. The air regulation system of claim 13, wherein the actuator interface module includes a microprocessor having an associated memory, a system interface connector which consists of the registered jack forty-five jack, a plurality of interface circuits, a plurality of data lines for connecting the system interface connector and the interface circuits in the actuator interface module, a power filter for separating power from data, an actuator connector for connecting the actuator interface module to the actuator allowing current to pass from the system interface connector to the actuator.

15. The air regulation system of claim 14, wherein the hub unit includes a microprocessor having an associated memory, a plurality of operator status indicators, a plurality of interface circuits, an input system interface connector, a plurality of data lines for connecting the input system interface connector and the interface circuits in the hub unit, a power filter for separating power and data to the microprocessor, an output system connector which consists of the registered jack forty-five jack contained in each port, and a relay driver for connecting the microprocessor to each output system interface connector.

16. The air regulation system of claim 15, further comprising a pilot tube flow cross sensor located in the balancing damper of the valve assembly for quantifying air flow in the damper.

17. An air regulation system for making a localized connection with an air distribution device located within a building, comprising:

a control unit for allowing an operator to send commands to the air regulation system having a front panel and a registered jack forty-five jack located on the front panel;

an industrial ethernet connector located in the air distribution device having a pair of registered jack forty-five jacks for allowing the control unit to make a localized connection at the air distribution device;

a coiled network connector cable connected between the control unit and the industrial ethernet connector for allowing a connection between the control unit and the industrial ethernet connector;

an actuator interface module having a registered jack forty-five jack for providing modular interface with the control unit;

a category five enhanced plenum cable connected between the industrial ethernet connector and the actuator interface module for allowing connection between the actuator interface module and the industrial ethernet connector;

a valve assembly having a balancing damper for the regulation of air flow;

an actuator connected to the valve assembly;

a modular cable connected between the actuator interface module and the actuator for allowing a connection between the actuator and the actuator interface module;

a hub unit for controlling multiple valve assemblies having a front panel and a back pane, the front panel having a registered jack forty-five jack and a pair of ports, each port having a registered jack forty-five jack, and a back panel with six ports, each port having a registered jack forty-five jack;

a category five enhanced plenum cable connected between the industrial ethernet connector and the hub unit for allowing a connection between the hub unit and the industrial ethernet connector;

a category five enhanced plenum cable connected between the hub unit and the actuator interface module for allowing a connection between the hub unit and the actuator interface module; and a tester unit having a front panel and a pair of registered jack forty-five jacks located on the front panel for testing proper functioning of the air regulation system.

18. The air regulation system of claim 17, wherein the front panel of the control unit includes an open terminal push button, a close terminal push button, a test terminal push button, a damper terminal push button, a low battery light-emitting diode, an on light-emitting diode, and a charge light-emitting diode.

19. The air regulation system of claim 18, further comprising a pair of twelve volt batteries and a one-hundred twenty volt input twelve volt output battery charger for powering the control unit.

20. The air regulation system of claim 19, further comprising a digital wireless transmitter for controlling the valve assembly via the control unit from a remote location.

21. The air regulation system of claim 20, wherein the front panel of the hub unit includes a damper select light-emitting diode and a ready light-emitting diode.

22. The air regulation system of claim 21, wherein the control unit includes a microprocessor having an associated memory, a plurality of control/status circuits for sending commands to the microprocessor, a power control/charger, a radio frequency receiver for receiving signals from the wireless transmitter, a radio frequency interface security decoder for accepting signals from the radio frequency receiver, a system interface connector which consists of the registered jack forty-five jack, and a plurality of interface circuits for sending power and data through the system connector.

23. The air regulation system of claim 22, wherein the actuator interface module includes a microprocessor having an associated memory, a system interface connector which consists of the registered jack forty-five jack, a plurality of interface circuits, a plurality of data lines for connecting the system interface connector and the interface circuits in the actuator interface module, a power filter for separating power from data, an actuator connector for connecting the actuator interface module to the actuator allowing current to pass from the system interface connector to the actuator.

24. The air regulation system of claim 23, wherein the hub unit includes a microprocessor having an associated memory, a plurality of operator status indicators, a plurality of interface circuits, an input system interface connector, a plurality of data lines for connecting the input system interface connector and the interface circuits in the hub unit, a power filter for separating power and data to the microprocessor, an output system connector which consists of the registered jack forty-five jack contained in each port, and a relay driver for connecting the microprocessor to each output system interface connector.

25. The air regulation system of claim 24, further comprising a pilot tube flow cross sensor located in the balancing damper of the valve assembly for quantifying air flow in the damper.

26. The air regulation system of claim 25, wherein the front panel of the tester unit has a good light-emitting diode, a bad light-emitting diode, and a test push terminal button.

27. The air regulation system of claim 26, wherein the tester unit includes a microprocessor having an associated memory, a plurality of control/status circuits for sending commands to the microprocessor, an open circuit, a close circuit, a data circuit, a system connector, and a system test connector for testing of cabling, wherein the cabling is connected to an actuator interface module simulator.

28. The air regulation system of claim 27, further comprising a pilot tube flow cross sensor located in the balancing damper of the valve assembly for quantifying air flow in the damper.

29. The air regulation system of claim 17, wherein the air regulation system controls a liquid, gas or vapor valve system.

30. The air regulation system of claim 17, wherein the air regulation system is utilized for the precise regulation and measurement of fresh air when the damper and air flow sensor assembly is placed between a fresh air source and a residential HVAC system included with an independent blower.

31. The air regulation system of claim 17, wherein the air regulation system controls a fire damper monitor and cycling.

32. A method for regulating the flow of air utilizing the air regulation system of claim 1, wherein the front panel of the control unit includes an open terminal push button, a close terminal push button, a test terminal push button, a damper terminal push button, a low battery light-emitting diode, an on light-emitting diode, a charge light-emitting diode, a microprocessor having an associated memory, a plurality of control/status circuits for sending commands to the microprocessor, a power control/charger, a radio frequency receiver for receiving signals from the wireless transmitter, a radio frequency interface security decoder for accepting signals from the radio frequency receiver, a system interface connector which consists of the registered jack forty-five jack, and a plurality of interface circuits for sending power and data through the system connector, and wherein the actuator interface module includes a microprocessor having an associated memory, a system interface connector which consists of the registered jack forty-five jack, a plurality of interface circuits, a plurality of data lines for connecting the system interface connector and the interface circuits in the actuator interface module, a power filter for separating power from data, an actuator connector for connecting the actuator interface module to the actuator allowing current to pass from the system interface connector to the actuator, the steps comprising:

(a) sending a command signal from the control unit to the actuator interface module by pressing a command button on the control unit by an operator;
(b) interpreting the command signal given by the operator by the control/status circuits and by the microprocessor;
(c) assembling a command string by receiving the command string by the microprocessor;
(d) sending the command string by the interface circuits;
(e) driving a data signal to the actuator interface module by the interface circuits;
(f) receiving a response signal from the actuator interface module by the interface circuits;
(g) interpreting the response signal by the microprocessor sent from the actuator interface module;
(h) signaling the interface circuits of the actuator interface by the microprocessor by sending current to the actuator by the system interface connector; and
(i) monitoring the current sent by the microprocessor of the actuator interface module to the actuator until completing the command.

33. A method of regulating air flow utilizing the air regulation system of claim 1 by a wireless transmitter and a control unit having a microprocessor having an associated memory, a plurality of control/status circuits for sending commands to the microprocessor, a power control/charger, a radio frequency receiver for receiving signals from the wireless transmitter, a radio frequency interface security decoder for accepting signals from the radio frequency receiver, a system interface connector which consists of the registered jack forty-five jack, and a plurality of interface circuits for sending power and data through the system connector, the steps comprising:

sending a signal from the wireless transmitter to the control unit by pressing a command button on the wireless transmitter by an operator;
generating a radio frequency signal by the wireless transmitter;
listening for the radio frequency signal by the radio frequency interface security decoder;
receiving the radio frequency signal by the radio frequency interface security decoder;
accepting the radio frequency signal by the radio frequency interface security decoder by a valid radio frequency security code;
sending the radio frequency signal to the microprocessor of the control unit; and
repeating steps (a) through (i).

34. A method of regulating air flow utilizing the air regulation system of claim 17, wherein the front panel of the control unit includes an open terminal push button, a close terminal push button, a test terminal push button, a damper terminal push button, a low battery light-emitting diode, an on light-emitting diode, a charge light-emitting diode, a microprocessor having an associated memory, a plurality of control/status circuits for sending commands to the microprocessor, a power control/charger, a radio frequency receiver for receiving signals from the wireless transmitter, a radio frequency interface security decoder for accepting signals from the radio frequency receiver, a system interface connector which consists of the registered jack forty-five jack, and a plurality of interface circuits for sending power and data through the system connector, and wherein the actuator interface module includes a microprocessor having an associated memory, a system interface connector which consists of the registered jack forty-five jack, a plurality of interface circuits, a plurality of data lines for connecting the system interface connector and the interface circuits in the actuator interface module, a power filter for separating power from data, an actuator connector for connecting the actuator interface module to the actuator allowing current to pass from the system interface connector to the actuator, wherein the hub unit includes a microprocessor having an associated memory, a plurality of operator status indicators, a plurality of interface circuits, an input system interface connector, a plurality of data lines for connecting the input system interface connector and the interface circuits in the hub unit, a power filter for separating power and data to the microprocessor, an output system connector which consists of the registered jack forty-five jack contained in each port, and a relay driver for connecting the microprocessor to each output system interface connector, and the tester unit having a front panel, the front panel having a registered jack forty-five jack, a good light-emitting diode, a bad light-emitting diode, a test push terminal button, and a microprocessor having an associated memory, a plurality of control/status circuits for sending commands to the microprocessor, an open circuit, a close circuit, a data circuit, and a system test connector for testing of cabling, wherein the cabling is connected to an actuator interface module simulator, the steps comprising:

sending a command signal from the control unit to the actuator interface module by pressing a command button on the control unit by an operator;
interpreting the command signal given by the operator by the control/status circuits and by the microprocessor;
assembling a command string by receiving the command string by the microprocessor;
sending the command string by the interface circuits;
driving a data signal by the interface circuits of the control unit to the hub unit;
listening for a command from the control unit by the interface circuits of the hub unit;
receiving the command from the control unit by the interface circuits of the hub unit;
analyzing the command from the control unit by the microprocessor of the hub unit;
performing the command from the control unit by the microprocessor of the hub unit;
signaling the interface circuits of the actuator interface module by the microprocessor by sending current to the actuator by the system interface connector; and
monitoring the current sent by the microprocessor of the actuator interface module to the actuator until completing the command.

35. A method for testing individual components of the air regulation system of claim 17 to ensure proper functioning utilizing a tester unit having a front panel, the front panel having a registered jack forty-five jack, a good light-emitting diode, a bad light-emitting diode, a test push terminal button, and a microprocessor having an associated memory, a plurality of control/status circuits for sending commands to the microprocessor, an open circuit, a close circuit, a data circuit, and a system test connector for testing of cabling, wherein the cabling is connected to an actuator interface module simulator, the steps comprising:

connecting the tester unit to the air regulation system for testing proper functioning;

initializing all parameters for performing testing of the air regulation system;

pressing a test button on the tester unit by an operator;

checking for a valid device by a plurality of open/close data circuits;

acknowledging that all the circuits are present and valid; and illuminating a good light-emitting diode when all the circuits are present and valid.

36. A method for applying security measures utilizing the air regulation system of claim 17, wherein the front panel of the control unit having local data includes an open terminal push button, a close terminal push button, a test terminal push button, a damper terminal push button, a low battery light-emitting diode, an on light-emitting diode, a charge light-emitting diode, a microprocessor having an associated memory, a plurality of control/status circuits for sending commands to the microprocessor, a power control/charger, a radio frequency receiver for receiving signals from the wireless transmitter, a radio frequency interface security decoder for accepting signals from the radio frequency receiver, a system interface connector which consists of the registered jack forty-five jack, and a plurality of interface circuits for sending power and data through the system connector, and wherein the actuator interface module includes a microprocessor having an associated memory, a system interface connector which consists of the registered jack forty-five jack, a plurality of interface circuits, a plurality of data lines for connecting the system interface connector and the interface circuits in the actuator interface module, a power filter for separating power from data, an actuator connector for connecting the actuator interface module to the actuator allowing current to pass from the system interface connector to the actuator, the steps comprising:

performing a status query;

sending a random data packet from the control unit to the actuator interface module by the data lines of the system interface connector of the control unit;

receiving encrypted data from the actuator interface module to the control unit by the system interface connector of the actuator interface module;

checking the received data from the actuator interface module against the local data of the control unit;

determining whether there is a match of the encrypted data sent by the actuator interface module and the local data of the control unit; and setting status to a valid actuator interface module when the local data of the control unit matches the received data of the actuator interface module.

* * * * *